(12) United States Patent
Murakami

(10) Patent No.: US 12,279,194 B2
(45) Date of Patent: Apr. 15, 2025

(54) COMMUNICATION SYSTEM, MANAGEMENT DEVICE, COMMUNICATION INSTRUMENT, AND COMMUNICATION CONTROL METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 497 days.

(21) Appl. No.: 17/621,202

(22) PCT Filed: Jun. 11, 2020

(86) PCT No.: PCT/JP2020/023066
§ 371 (c)(1),
(2) Date: Dec. 20, 2021

(87) PCT Pub. No.: WO2020/262021
PCT Pub. Date: Dec. 30, 2020

(65) Prior Publication Data
US 2022/0353657 A1  Nov. 3, 2022

(30) Foreign Application Priority Data
Jun. 27, 2019  (JP) ................. 2019-120107

(51) Int. Cl.
*H04W 76/50* (2018.01)
*H04W 4/33* (2018.01)
(Continued)

(52) U.S. Cl.
CPC ............... *H04W 4/50* (2018.02); *H04W 4/33* (2018.02); *H04W 4/90* (2018.02)

(58) Field of Classification Search
CPC .......... H04W 4/50; H04W 4/33; H04W 4/90; H04W 76/50; H04W 16/12
See application file for complete search history.

(56) References Cited

U.S. PATENT DOCUMENTS

2011/0171929 A1*  7/2011  Tamura ................ H04W 48/12
                                                           455/404.1
2019/0069154 A1   2/2019  Booth et al.

FOREIGN PATENT DOCUMENTS

JP      2011-109508 A    6/2011
WO   WO 2015042487 A1   3/2015
(Continued)

OTHER PUBLICATIONS

Extended European Search Report, dated Jul. 25, 2022, for European Patent Application No. 20831074.8-1215. (6 pages).
(Continued)

*Primary Examiner* — Joseph E Dean, Jr.
(74) *Attorney, Agent, or Firm* — Seed IP Law Group LLP

(57) ABSTRACT

In the present invention, data is transmitted more suitably in an emergency state. This communication system comprises: a management device that manages first data including settings pertaining to communication during a normal state, and second data including settings pertaining to communication during an emergency state; and a communication instrument that controls a communication operation to another communication instrument in the normal state on the basis of the first data received from the management device, and that controls a communication operation to the other communication instrument in the emergency state on the basis of the second data received from the management device.

8 Claims, 30 Drawing Sheets

(51) Int. Cl.
    *H04W 4/50*         (2018.01)
    *H04W 4/90*         (2018.01)
    *H04W 16/12*       (2009.01)

(56) References Cited

FOREIGN PATENT DOCUMENTS

WO     WO-2015192113 A1 *  12/2015  ........... G01S 1/0428
WO     WO 2020257768 A1    12/2020

OTHER PUBLICATIONS

International Search Report, mailed Sep. 15, 2020, for International Application No. PCT/JP2020/023066, 5 pages (with English Translation).

Mody et al., "Spectrum . . . Be Prepared for Sharing," IEEE 802.22, Nov. 1, 2018, URL= https://mentor.ieee.org/802.22/dcn/19/22-19-0011-00-0000-tutorial-spectrum-be-prepared-for-sharing.pdf, 63 pages.

\* cited by examiner

FIRST DATABASE:
Normal Mode:
Area A:
Case 1-A-1:
The third communication method is available in the first frequency band for a period of less than 8 hours from "8:00 midnight".
Case 1-A-2:
The first communication method is available in the first frequency band for a period of less than 8 hours from "4:00 AM".
Case 1-A-3:
The second communication method is available in the first frequency band for a period of less than 8 hours from "4:00 PM".
Area B:
Case 1-B-1:
The third communication method is available in the first frequency band for a period of less than 6 hours from "midnight".
Case 1-B-2:
The first communication method is available in the first frequency band for a period of less than 6 hours from "6:00 AM".
Case 1-B-3:
The first communication method is available in the first frequency band for a period of less than 6 hours from "noon".
Case 1-B-4:
The second communication method is available in the first frequency band for a period of less than 6 hours from "6:00 PM".

Valid except for exceptional times

502

SECOND DATABASE:
Emergency Broadcasting Priority Mode:
Area A:
Case 2-A-1:
The third communication method is available in the first frequency band all day.
Area B:
Case 2-B-1:
The third communication method is available in the first frequency band all day.

Valid on May 1, 2019, and May 2, 2019

503

THIRD DATABASE:
Communication Priority Mode:
Area A:
Case 3-A-1:
The third communication method is available in the first frequency band for a period of less than 2 hours from "midnight".
Case 3-A-2:
The first communication method is available in the first frequency band for a period of less than 11 hours from "2:00 AM".
Case 3-A-3:
The second communication method is available in the first frequency band for a period of less than 11 hours from "1:00 PM".
Area B:
Case 3-B-1:
The third communication method is available in the first frequency band for a period of less than 6 hours from "midnight".
Case 3-B-2:
The second communication method is available in the first frequency band for a period of less than 6 hours from "6:00 AM".
Case 3-B-3:
The first communication method is available in the first frequency band for a period of less than 6 hours from "noon".
Case 3-B-4:
The second communication method is available in the first frequency band for a period of less than 6 hours from "6:00 PM".

Valid on May 3, 2019

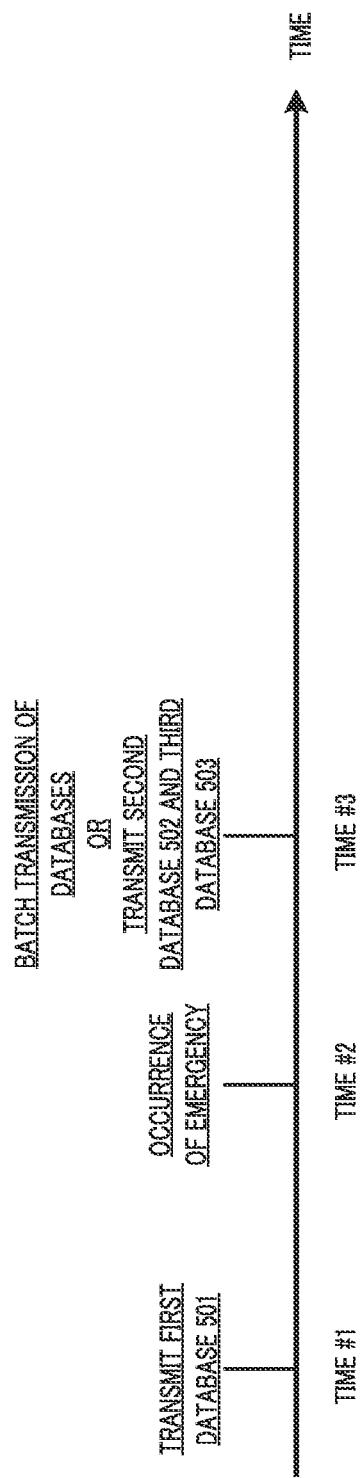

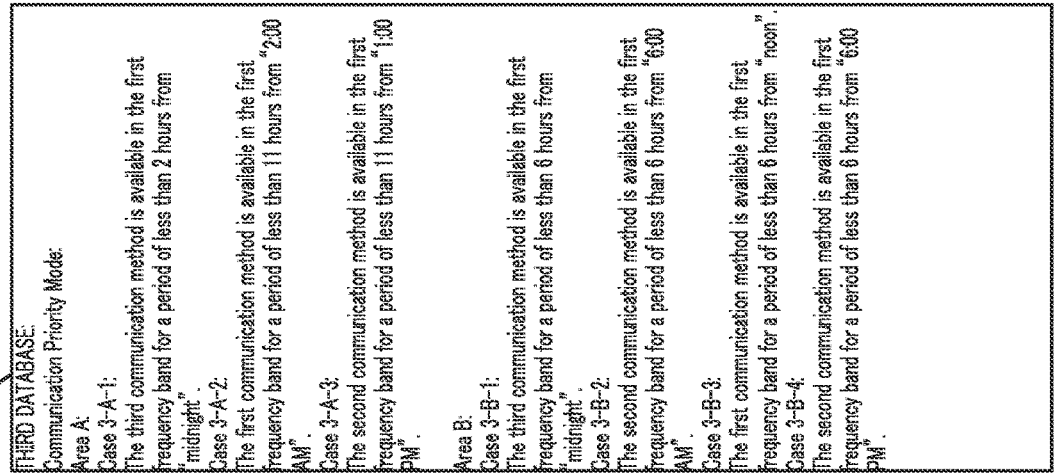
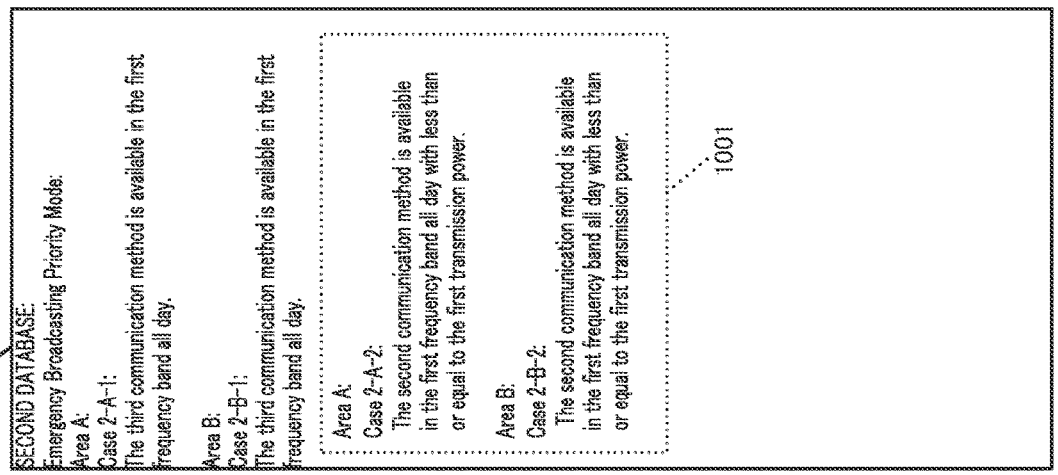
FIG. 10

FIRST DATABASE:
Normal Mode:
Area A:
Case 1-A-1:
The third communication method is available in the first frequency band for a period of less than 8 hours from "midnight".
Case 1-A-2:
The first communication method is available in the first frequency band for a period of less than 8 hours from "8:00 AM".
Case 1-A-3:
The second communication method is available in the first frequency band for a period of less than 8 hours from "4:00 PM".
Area B:
Case 1-B-1:
The third communication method is available in the first frequency band for a period of less than 6 hours from "midnight".
Case 1-B-2:
The first communication method is available in the first frequency band for a period of less than 6 hours from "6:00 AM".
Case 1-B-3:
The first communication method is available in the first frequency band for a period of less than 6 hours from "noon".
Case 1-B-4:
The second communication method is available in the first frequency band for a period of less than 6 hours from "6:00 PM".

501

SECOND DATABASE:
Emergency Broadcasting Priority Mode:
Area A:
Case 2-A-1:
The third communication method is available in the first frequency band all day.
Area B:
Case 2-B-1:
The third communication method is available in the first frequency band all day.

Area A:
Case 2-A-2:
The second communication method is available indoors in the first frequency band all day.
Area B:
Case 2-B-2:
The second communication method is available indoors in the first frequency band all day.

1101

502

THIRD DATABASE:
Communication Priority Mode:
Area A:
Case 3-A-1:
The third communication method is available in the first frequency band for a period of less than 2 hours from "midnight".
Case 3-A-2:
The first communication method is available in the first frequency band for a period of less than 11 hours from "2:00 AM".
Case 3-A-3:
The second communication method is available in the first frequency band for a period of less than 11 hours from "1:00 PM".
Area B:
Case 3-B-1:
The third communication method is available in the first frequency band for a period of less than 6 hours from "midnight".
Case 3-B-2:
The first communication method is available in the first frequency band for a period of less than 6 hours from "6:00 AM".
Case 3-B-3:
The first communication method is available in the first frequency band for a period of less than 6 hours from "noon".
Case 3-B-4:
The second communication method is available in the first frequency band for a period of less than 6 hours from "6:00 PM".

FIRST DATABASE:
Normal Mode:
Area A:
Case 1-A-1:
The third communication method is available in the first frequency band for a period of less than 8 hours from "midnight".
Case 1-A-2:
The first communication method is available in the first frequency band for a period of less than 8 hours from "8:00 AM".
Case 1-A-3:
The second communication method is available in the first frequency band for a period of less than 8 hours from "4:00 PM".

Area B:
Case 1-B-1:
The third communication method is available in the first frequency band for a period of less than 6 hours from "midnight".
Case 1-B-2:
The first communication method is available in the first frequency band for a period of less than 6 hours from "6:00 AM".
Case 1-B-3:
The first communication method is available in the first frequency band for a period of less than 6 hours from "noon".
Case 1-B-4:
The second communication method is available in the first frequency band for a period of less than 6 hours from "6:00 PM".

501

SECOND DATABASE:
Emergency Broadcasting Priority Mode:
Area A:
Case 2-A-1:
The third communication method is available in the first frequency band all day.

Area B:
Case 2-B-1:
The third communication method is available in the first frequency band all day.

Area A:
Case 2-A-2:
The second communication method is available indoors in the first frequency band all day with less than or equal to the first transmission power.

Area B:
Case 2-B-2:
The second communication method is available indoors in the first frequency band all day with less than or equal to the first transmission power.

1201

502

THIRD DATABASE:
Communication Priority Mode:
Area A:
Case 3-A-1:
The third communication method is available in the first frequency band for a period of less than 2 hours from "midnight".
Case 3-A-2:
The first communication method is available in the first frequency band for a period of less than 11 hours from "2:00 AM".
Case 3-A-3:
The second communication method is available in the first frequency band for a period of less than 11 hours from "1:00 PM".

Area B:
Case 3-B-1:
The third communication method is available in the first frequency band for a period of less than 6 hours from "midnight".
Case 3-B-2:
The first communication method is available in the first frequency band for a period of less than 6 hours from "6:00 AM".
Case 3-B-3:
The first communication method is available in the first frequency band for a period of less than 6 hours from "noon".
Case 3-B-4:
The second communication method is available in the first frequency band for a period of less than 6 hours from "6:00 PM".

COMMUNICATION SYSTEM, MANAGEMENT DEVICE, COMMUNICATION INSTRUMENT, AND COMMUNICATION CONTROL METHOD

TECHNICAL FIELD

The present disclosure relates to a communication system, a management apparatus, a communication device, and a communication control method.

BACKGROUND ART

As a conventional method of allowing a plurality of communication methods to coexist in a first frequency band, Non-Patent Literature (hereinafter referred to as "NPL") 1 discloses a method of creating a database according to locations and time periods, for example, and controlling communication devices based on the database.

CITATION LIST

Non Patent Literature

NPL 1

IEEE 802.22, Spectrum Be Prepared for Sharing, [online], Internet <URL: https://mentor.ieee.org/802.22/dcn/19/22-19-0011-00-0000-tutorial-spectrum-be-prepared-for-sharing.pdf>

SUMMARY OF INVENTION

Technical Problem

The conventional technique, however, does not mention an appropriate control method according to surrounding conditions, and unfortunately it is still hard to control communication devices according to the surrounding conditions.

Solution to Problem

A communication system according to an embodiment of the present disclosure includes: a management apparatus, which in operation, manages first data including a configuration on communication in a normal state and second data including a configuration on communication in an emergency state; and a communication device, which in operation, controls a communication operation for another communication device in the normal state based on the first data received from the management apparatus, and controls the communication operation for the other communication device in the emergency state based on the second data received from the management apparatus.

It should be noted that general or specific embodiments may be implemented as a system, an apparatus, a method, an integrated circuit, a computer program, a storage medium such as a computer-readable CD-ROM, or any selective combination thereof.

Advantageous Effects of Invention

According to the present disclosure, it is possible to accelerate system performance improvement, service quality enhancement, and support for new service forms, by utilizing communication.

BRIEF DESCRIPTION OF DRAWINGS

FIG. 8 illustrates a second example of the database according to Embodiment 1;

FIG. 9 illustrates a third example of the operation of transmitting the database by the first apparatus according to Embodiment 1;

FIG. 10 illustrates a third example of the database according to Embodiment 1;

FIG. 11 illustrates a fourth example of the database according to Embodiment 1;

FIG. 12 illustrates a fifth example of the database according to Embodiment 1;

DESCRIPTION OF EMBODIMENTS

Some of a plurality of aspects included in the present disclosure are exemplified below. A communication system according to an embodiment of the present disclosure includes: a management apparatus, which in operation, manages first data including a configuration on communication in a normal state and second data including a configuration on communication in an emergency state; and a communication device, which in operation, controls a communication operation for another communication device in the normal state based on the first data received from the management apparatus, and controls the communication operation for the other communication device in the emergency state based on the second data received from the management apparatus.

The above aspect allows the communication operation to be switched in accordance with occurrence of the emergency state, and this increases the probability of transmitting more appropriate data to users in the emergency state. The case where the emergency state occurs includes the case where a disaster and/or a man-made disaster occurs, or the case where a disaster is expected to occur. The disaster includes, for example, an earthquake, a typhoon, a flood, a tsunami, an eruption, a drought, a major fire, an epidemic of an infectious disease, and a fire. Note that the emergency state is not limited to the disaster or man-made disaster, and may be any state where information to be widely announced to people has occurred (e.g., emergency news, emergency bulletin, emergency announcement, etc.).

It should be noted that general or specific embodiments may be implemented as a system, a method, an integrated circuit, a computer program, a storage medium such as a computer-readable CD-ROM, or any selective combination thereof.

Hereinafter, embodiments will be described in detail with reference to the accompanying drawings.

It should be noted that the embodiments described below are all general or specific examples. The numerical values, shapes, materials, components, arrangement positions and connection forms of the components, steps, order of the steps, etc. described in the following embodiments are examples, and are not intended to limit the present disclosure. Further, a plurality of aspects from different perspectives are disclosed in the following embodiments, and components required for respective aspects are different from each other. Components that are not recited in the independent claims are described as optional components.

Embodiment 1

Figure 1:
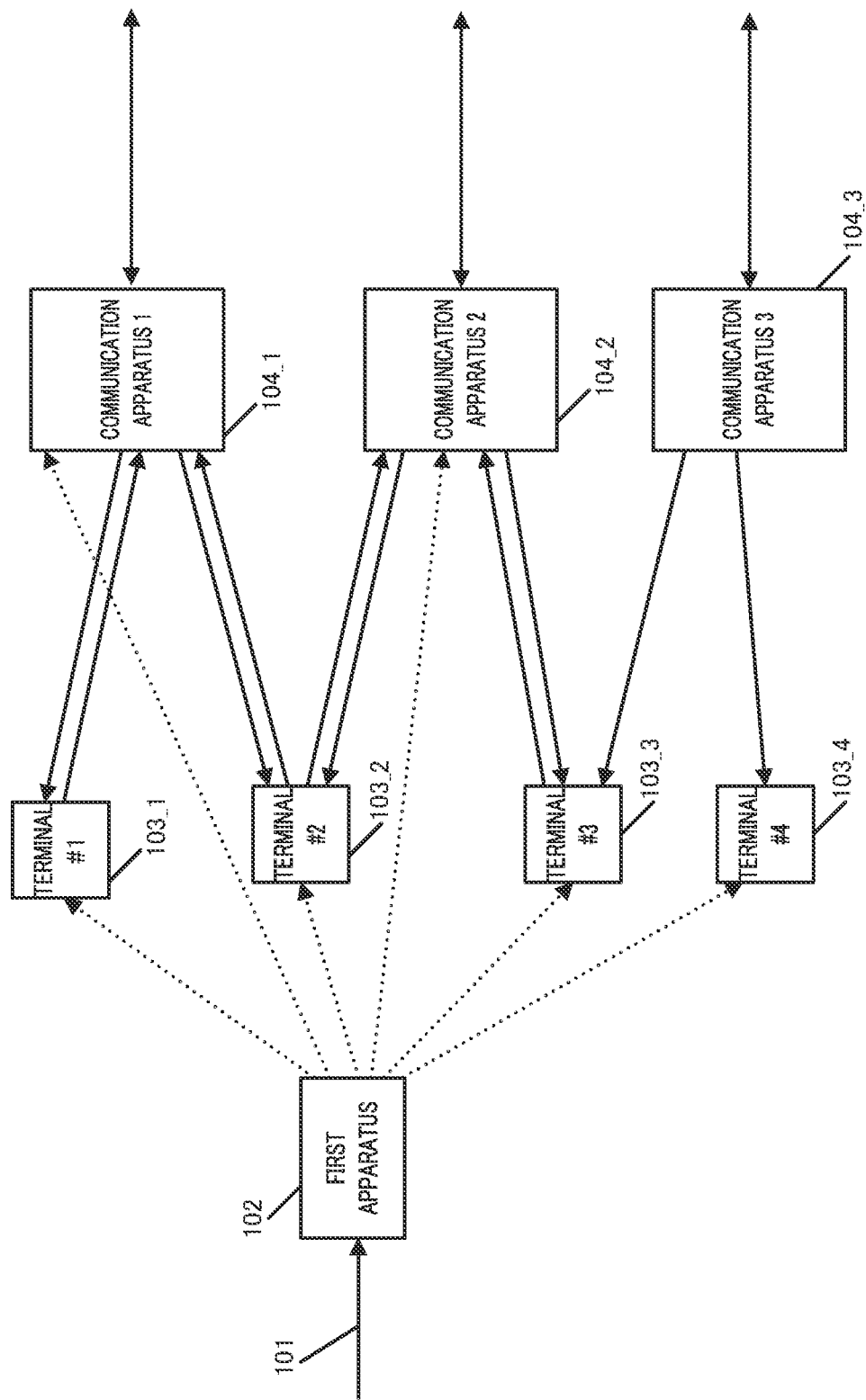
FIG. 1 illustrates an exemplary configuration of a system according to Embodiment 1.

FIG. 1 illustrates an exemplary configuration of a system according to Embodiment 1. First apparatus 102, which is an example of a management apparatus, takes data 101, which is a database on communication, as input. At this time, data 101, which is the database on communication, is considered to include a database for a first frequency band.

For example, the database for the first frequency hand included in data 101, which is the database on communication, is considered to include information on areas where the database is valid, information on available communication methods, information on available time for each communication method, and the like.

Note that data 101, which is the database on communication, may include a database on communication in a frequency hand other than the first frequency band.

First apparatus 102 takes data 101, which is the database on communication, as input, generates signals including the database for the first frequency band, and transmits the signals to terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3. At this time, communication between terminal #1 with 103_1 and first apparatus 102, communication between terminal #2 with 103_2 and first apparatus 102, communication between terminal #3 with 103_3 and first apparatus 102, communication between terminal #4 with 103_4 and first apparatus 102, communication between communication apparatus 1 with 104_1 and first apparatus 102, communication between communication apparatus 2 with 104_2 and first apparatus 102, and communication between communication apparatus 3 with 104_3 and first apparatus 102 may be radio communication or wired communication. Note that the terminals and the communication apparatuses are examples of communication devices.

Incidentally, terminal #1 with 103_1 and communication apparatus 1 with 104_1 are supposed to be capable of performing radio communication using a first communication method in the first frequency band.

Terminal #2 with 103_2 and communication apparatus 1 with 104_1 are supposed to be capable of performing radio communication using the first communication method in the first frequency band. Terminal #2 with 103_2 and communication apparatus 2 with 104_2 are supposed to be capable of performing radio communication using a second communication method in the first frequency band.

Terminal #3 with 103_3 and communication apparatus 2 with 104_2 are supposed to be capable of performing radio communication using the second communication method in the first frequency band. Terminal #3 with 103_3 is supposed to be capable of receiving modulated signals transmitted by communication apparatus 3 with 104_3 using a third communication method in the first frequency band.

Terminal #4 with 103_4 is supposed to be capable of receiving modulated signals transmitted by communication apparatus 3 with 104_3 using the third communication method in the first frequency hand.

Communication apparatus 1 with 104_1 may perform communication with another communication apparatus via a network, for example. Likewise, communication apparatus 2 with 104_2 may perform communication with another communication apparatus via a network, for example. Also, communication apparatus 3 with 104_3 may perform communication with another communication apparatus via a network.

Terminal #1 with 103_1, terminal #2 with 103_2, and communication apparatus 1 with 104_1 determine that the communication by the first communication method in the first frequency band is possible from data 101, which is the database on communication, obtained from first apparatus 102, and then terminal #1 with 103_1 and communication apparatus 1 with 104_1 communicate with each other and terminal #2 with 103_2 and communication apparatus 1 with 104_1 communicate with each other.

Terminal #2 with 103_2, terminal #3 with 103_3, and communication apparatus 2 with 104_2 determine that the communication by the second communication method in the first frequency band is possible from data 101, which is the database on communication, obtained from first apparatus 102, and then terminal #2 with 103_2 and communication apparatus 2 with 104_2 communicate with each other and terminal #3 with 103_3 and communication apparatus 2 with 104_2 communicate with each other.

Terminal #3 with 103_3, terminal #4 with 103_4, and communication apparatus 3 with 104_3 determine that the communication by the third communication method in the first frequency band is possible from data 101, which is the database on communication, obtained from first apparatus 102. Then, communication apparatus 3 with 104_3 transmits modulated signals for the third communication method in the first frequency band, and terminal #3 with 103_3 and terminal #4 with 103_4 receive the modulated signals.

At this time, the database on communication controls use of the first communication method in the first frequency band, the second communication method in the first frequency band, and the third communication method in the first frequency band according to, for example, locations and time periods so as not to cause interferences in the first frequency band. This secures high data reception quality for each communication method.

Note that NPL 1 discloses the above points.

In the present invention, for example, first apparatus 102 in FIG. 1 has a plurality of databases on communication, and switches the databases on communication according to a situation, so that terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 switch communication operations. This produces the effect of realizing communication according to the situation.

In the present embodiment, descriptions will be given of, for example, how first apparatus 102 in FIG. 1, which has the plurality of databases on communication, switches the databases on communication according to the situation, and how terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 switch the communication operations.

A detailed operation in FIG. 1 will be described, by way of example.

Figure 2:
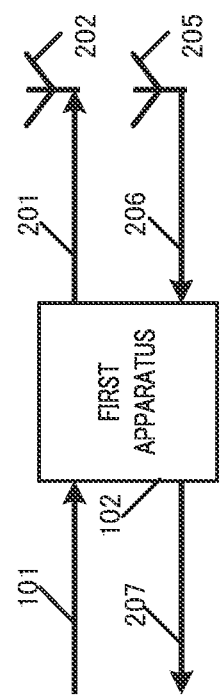
FIG. 2 illustrates an exemplary configuration of a first apparatus according to Embodiment 1.

FIG. 2 illustrates an exemplary configuration of the first apparatus in FIG. 1. Note that, in FIG. 2, components that operate in the same way as in FIG. 1 are denoted by the same reference signs.

First apparatus 102, for example, has a plurality of databases and takes data 101, which is the database on communication, as input. First apparatus 102 then generates and outputs modulated signal 201 including "data 101, which is the database on communication, or part of data. 101, which is the database on communication". Modulated signal 201 is transmitted from antenna 202. Note that FIG. 2 is merely an example, and first apparatus 102 may be a wired communication apparatus although it is described as a radio communication apparatus in FIG. 2.

Received signal 206 in FIG. 2 is a received signal in receiving a modulated signal transmitted by terminal #1 with 103_1, terminal #2 with 103_2, terminal #3 with 103_3, terminal #4 with 103_4, communication apparatus 1 with 104_1, communication apparatus 2 with 104_2, and/or communication apparatus 3 with 104_3 in FIG. 1. Note that received signal 206 is received by antenna 205. Then, first apparatus 102 takes received signal 206 as input, performs demodulation, and outputs received data 207.

Note that first apparatus 102 may have a configuration without the reception-related sections.

Figure 3:
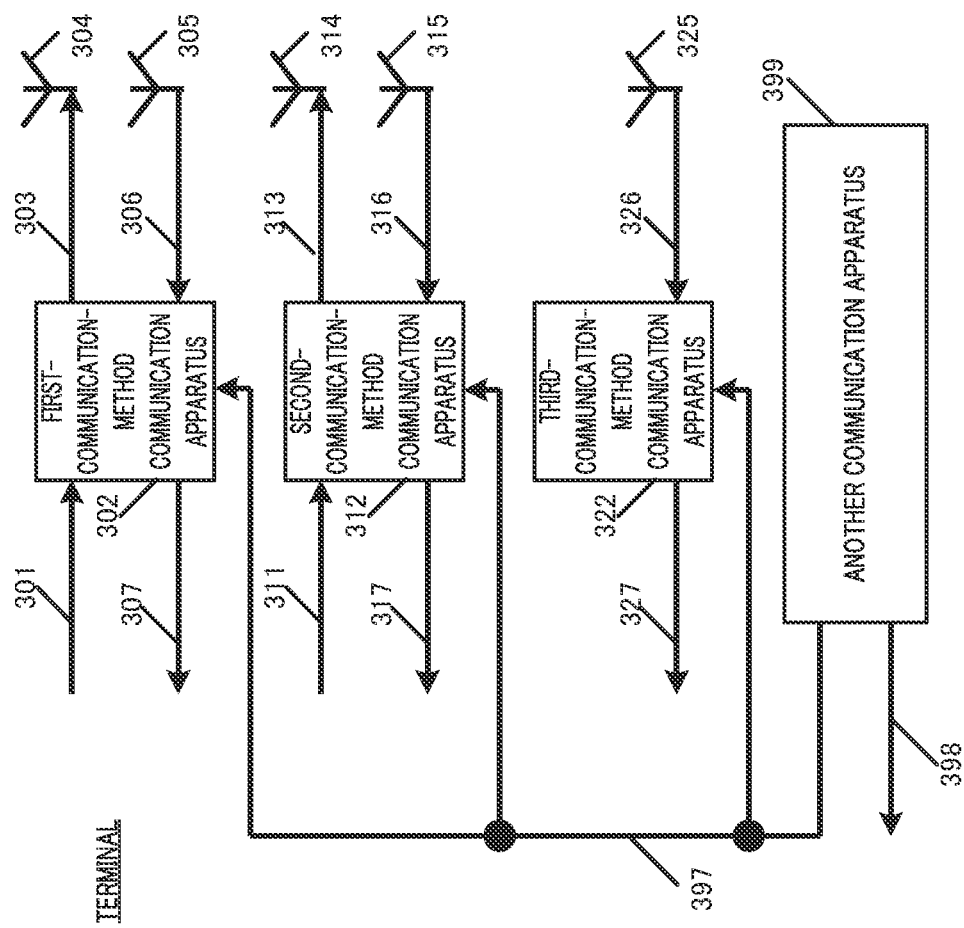
FIG. 3 illustrates an exemplary configuration of a terminal according to Embodiment 1.

FIG. 3 illustrates an exemplary configuration of a "terminal having the configuration of terminal #1 with 103_1, terminal #2 with 103_2, terminal #3 with 103_3, and terminal #4 with 103_4 in FIG. 1". The exemplary configuration of the terminal in FIG. 3 includes a section related to the first communication method, a section related to the second communication method, a section related to the third communication method, and a section related to another communication apparatus.

First, a description will be given of the section related to another communication apparatus.

Another communication apparatus 399 obtains received data 398 by receiving and demodulating a signal (modulated signal) transmitted by first apparatus 102 in FIG. 1, and outputs received data 398. Another communication apparatus 399 also outputs control signal 397 for controlling which communication apparatus to operate: "first-communication-method communication apparatus 302", "second-communication-method communication apparatus 312", or "third-communication-method communication apparatus 322", based on data 101, which is the database on communication, included in received data 398.

First-communication-method communication apparatus 302 takes control signal 397 as input, and operates when control signal 397 includes information "to operate first-communication-method communication apparatus 302". An exemplary operation thereof will be described below.

When first-communication-method communication apparatus 302 operates, first-communication-method communication apparatus 302 takes data 301 as input, performs processing such as error correction encoding and modulation, and outputs modulated signal 303. Modulated signal 303 is outputted as a radio wave from antenna 304.

When first-communication-method communication apparatus 302 operates, first-communication-method communication apparatus 302 also takes received signal 306 received by antenna 305 as input, performs processing such as demodulation and error correction decoding, and outputs received data 307.

Note that first-communication-method communication apparatus 302 in FIG. 3 may transmit a plurality of modulated signals with a plurality of antennas, and may receive a plurality of modulated signals from a plurality of antennas.

Second-communication-method communication apparatus 312 takes control signal 397 as input, and operates when control signal 397 includes information "to operate second-communication-method communication apparatus 312". An exemplary operation thereof will be described below.

When second-communication-method communication apparatus 312 operates, second-communication-method communication apparatus 312 takes data 311 as input, performs processing such as error correction encoding and modulation, and outputs modulated signal 313. Modulated signal 313 is outputted as a radio wave from antenna 314.

When second-communication-method communication apparatus 312 operates, second-communication-method communication apparatus 312 also takes received signal 316 received by antenna 315 as input, performs processing such as demodulation and error correction decoding, and outputs received data 317.

Note that second-communication-method communication apparatus 312 in FIG. 3 may transmit a plurality of modulated signals with a plurality of antennas, and may receive a plurality of modulated signals from a plurality of antennas.

Third-communication-method communication apparatus 322 takes control signal 397 as input, and operates when control signal 397 includes information "to operate third-communication-method communication apparatus 322". An exemplary operation thereof will be described below.

When third-communication-method communication apparatus 322 operates, third-communication-method communication apparatus 322 also takes received signal 326 received by antenna 325 as input, performs processing such as demodulation and error correction decoding, and outputs received data 327.

Note that third-communication-method communication apparatus 322 in FIG. 3 may receive a plurality of modulated signals from a plurality of antennas.

The configuration of the terminal in FIG. 3 describes the configuration including first-communication-method communication apparatus 302, second-communication-method communication apparatus 312, and third-communication-method communication apparatus 322, but the terminal only needs to be configured to include any one or more of the communication apparatuses, which are first-communication-method communication apparatus 302, second-communication-method communication apparatus 312 and third-communication-method communication apparatus 322.

Figure 4:
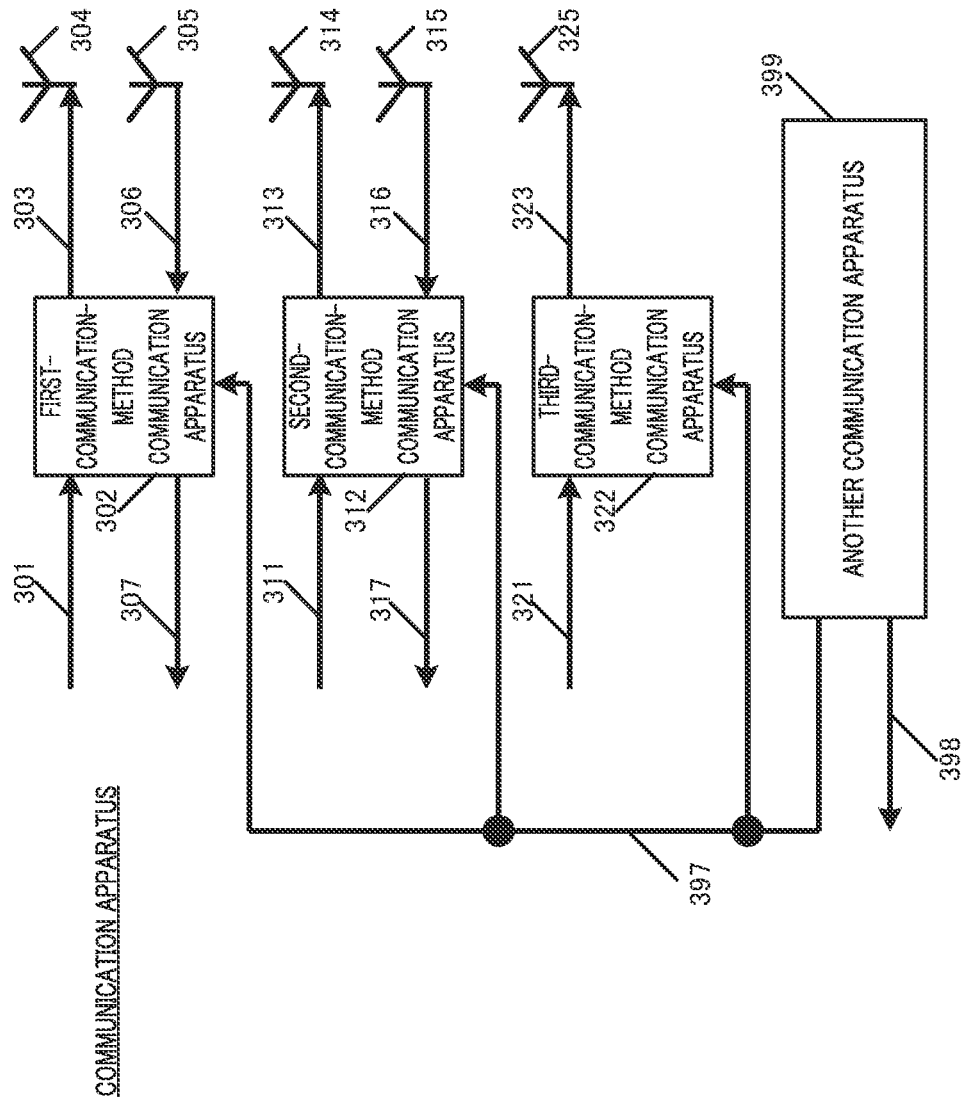
FIG. 4 illustrates an exemplary configuration of a communication apparatus according to Embodiment 1.

FIG. 4 illustrates an exemplary configuration of "communication apparatus 1 with 104_1, communication apparatus 2 with 104_2, and communication apparatus 3 with 104_3 in FIG. 1". The exemplary configuration of the communication apparatus or terminal in FIG. 4 includes a section related to the first communication method, a section related to the second communication method, a section related to the third communication method, and a section related to another communication apparatus. Note that, in FIG. 4, components that operate in the same way as in FIG. 3 are denoted by the same reference signs.

First, a description will be given of the section related to another communication apparatus.

Another communication apparatus 399 obtains received data 398 by receiving and demodulating a signal (modulated signal) transmitted by first apparatus 102 in FIG. 1, and outputs received data 398. Another communication apparatus 399 also outputs control signal 397 for controlling which communication apparatus to operate: "first-communication-method communication apparatus 302", "second-communication-method communication apparatus 312", or "third-communication-method communication apparatus 322", based on data 101, which is the database on communication, included in received data 398.

First-communication-method communication apparatus 302 takes control signal 397 as input, and operates when control signal 397 includes information "to operate first-communication-method communication apparatus 302". An exemplary operation thereof will be described below.

When first-communication-method communication apparatus 302 operates, first-communication-method communication apparatus 302 takes data 301 as input, performs processing such as error correction encoding and modulation, and outputs modulated signal 303. Modulated signal 303 is outputted as a radio wave from antenna 304.

When first-communication-method communication apparatus 302 operates, first-communication-method communication apparatus 302 also takes received signal 306 received by antenna 305 as input, performs processing such as demodulation and error correction decoding, and outputs received data 307.

Note that first-communication-method communication apparatus 302 in FIG. 4 may transmit a plurality of modulated signals with a plurality of antennas, and may receive a plurality of modulated signals from a plurality of antennas.

Second-communication-method communication apparatus 312 takes control signal 397 as input and operates when control signal 397 includes information "to operate second-communication-method communication apparatus 312". An exemplary operation thereof will be described below.

When second-communication-method communication apparatus 312 operates, second-communication-method communication apparatus 312 takes data 311 as input, performs processing such as error correction encoding and modulation, and outputs modulated signal 313. Modulated signal 313 is outputted as a radio wave from antenna 314.

When second-communication-method communication apparatus 312 operates, second-communication-method communication apparatus 312 also takes received signal 316 received by antenna 315 as input, performs processing such as demodulation and error correction decoding, and outputs received data 317.

Note that second-communication-method communication apparatus 312 in FIG. 4 may transmit a plurality of modulated signals with a plurality of antennas, and may receive a plurality of modulated signals from a plurality of antennas.

Third-communication-method communication apparatus 322 takes control signal 397 as input and operates when control signal 397 includes information "to operate third-communication-method communication apparatus 322". An exemplary operation thereof will be described below.

When third-communication-method communication apparatus 322 operates, third-communication-method communication apparatus 322 takes data 321 as input, performs processing such as error correction encoding and modulation, and outputs modulated signal 323. Modulated signal 323 is outputted as a radio wave from antenna 325.

Note that third-communication-method communication apparatus 322 in FIG. 4 may transmit a plurality of modulated signals with a plurality of antennas.

The configuration of the terminal in FIG. 4 describes the configuration including first-communication-method communication apparatus 302, second-communication-method communication apparatus 312, and third-communication-method communication apparatus 322, but the communication apparatus only needs to be configured to include any one or more of the communication apparatuses, which are first-communication-method communication apparatus 302, second-communication-method communication apparatus 312, and third-communication-method communication apparatus 322.

Figure 5:
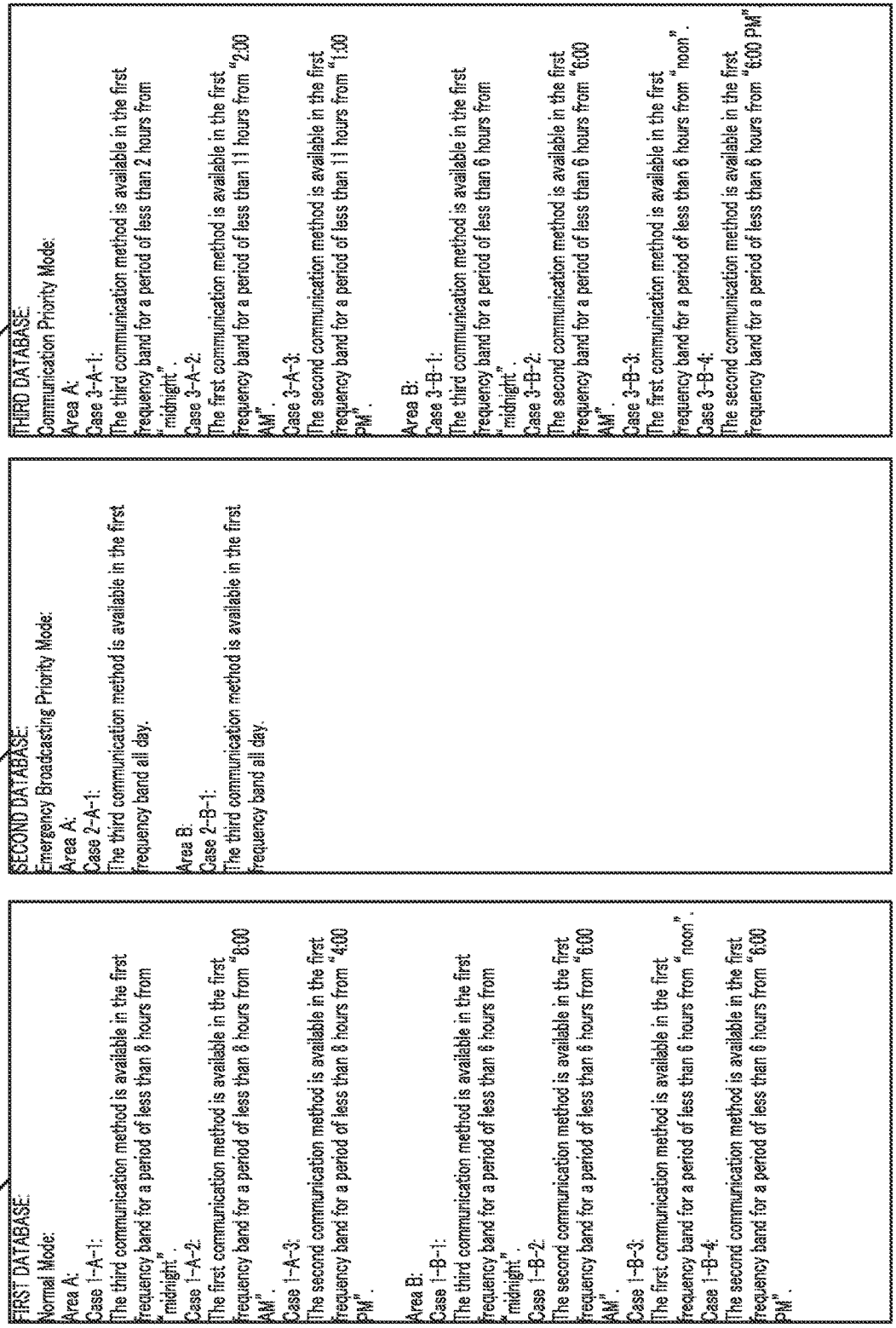
FIG. 5 illustrates a first example of a database according to Embodiment 1.

FIG. 5 illustrates an exemplary configuration of data 101, which is the database on communication methods and is taken as input by first apparatus 102, described in FIGS. 1 and 2.

The database on the communication methods is composed of three types of databases, which are first database 501, second database 502, and third database 503. Note that data in first database 501 is an example of first data, data in second database 502 is an example of second data, and data in third database 503 is an example of third data.

First database 501 indicates a "normal mode" and includes a database for area A and a database for area B.

Specific contents of the database for area A included in first database 501 are as follows.

Case 1-A-1:
  The third communication method is available in the first frequency band for a period of less than 8 hours from "midnight".
Case 1-A-2:
  The first communication method is available in the first frequency band for a period of less than 8 hours from "8:00 AM".
Case 1-A-3:
  The second communication method is available in the first frequency band for a period of less than 8 hours from "4:00 PM".

Additionally, specific contents of the database for area B included in first database 501 are as follows.
Case 1-B-1:
  The third communication method is available in the first frequency band for a period of less than 6 hours from "midnight".
Case 1-B-2:
  The second communication method is available in the first frequency band for a period of less than 6 hours from "6:00 AM".
Case 1-B-3:
  The first communication method is available in the first frequency band for a period of less than 6 hours from "noon".
Case 1-B-4:
  The second communication method is available in the first frequency band for a period of less than 6 hours from "6:00 PM".

Second database 502 indicates an "emergency broadcasting priority mode" and includes a database for area A and a database for area B.

A specific content of the database for area A included in second database 502 is as follows.
Case 2-A-1:
  The third communication method is available in the first frequency band all day.

Additionally, a specific content of the database for area B included in second database 502 is as follows.
Case 2-B-1:
  The third communication method is available in the first frequency band all day.

Third database 503 indicates a "communication priority mode" and includes a database for area A and a database for area B.

Specific contents of the database for area A included in third database 503 are as follows.
Case 3-A-1:
  The third communication method is available in the first frequency band for a period of less than 2 hours from "midnight".
Case 3-A-2:
  The first communication method is available in the first frequency band for a period of less than 11 hours from "2:00 AM".
Case 3-A-3:
  The second communication method is available in the first frequency band for a period of less than 11 hours from "1:00 PM".

Additionally, specific contents of the database for area B included in third database 503 are as follows.
Case 3-B-1:
  The third communication method is available in the first frequency band for a period of less than 6 hours from "midnight".
Case 3-B-2:
  The second communication method is available in the first frequency band for a period of less than 6 hours from "6:00 AM".
Case 3-B-3:
  The first communication method is available in the first frequency band for a period of less than 6 hours from "noon".
Case 3-B-4:
  The second communication method is available in the first frequency band for a period of less than 6 hours from "6:00 PM".

First apparatus 102 in FIG. 1 transmits modulated signals including information corresponding to any one or more of the databases, which are first database 501, second database 502, and third database 503. The modulated signals are received by terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1. Then, each of the devices obtains the information of the database, performs control based on the database, and generates and transmits a modulated signal for the first frequency band according to the database. In terms of reception-related operations, each of the devices also performs processing in accordance with the database and obtains received data.

Note that the database in FIG. 5 is composed of the three types of databases (first database 501, second database 502, and third database 503), but the same can be implemented with one or more types or two or more types of databases. In addition, although FIG. 5 illustrates the example of holding the databases for area A and area B, the database need not include area information or may be configured to hold databases for one or more areas or two or more areas.

Further, although the database in FIG. 5 is composed of the databases for the first frequency band, the database may be composed of databases for a plurality of frequency bands. Although the three communication methods are available in the first frequency band in the above description, the same can be implemented with one or more available communication methods or two or more available communication methods.

Next, exemplary operations of the system in FIG. 1 will be described along the time line. In the following, descriptions will be given of a case where first apparatus 102 in FIG. 1 transmits the databases at a time and a case where first apparatus 102 transmits the databases one for each time.

Figure 6:
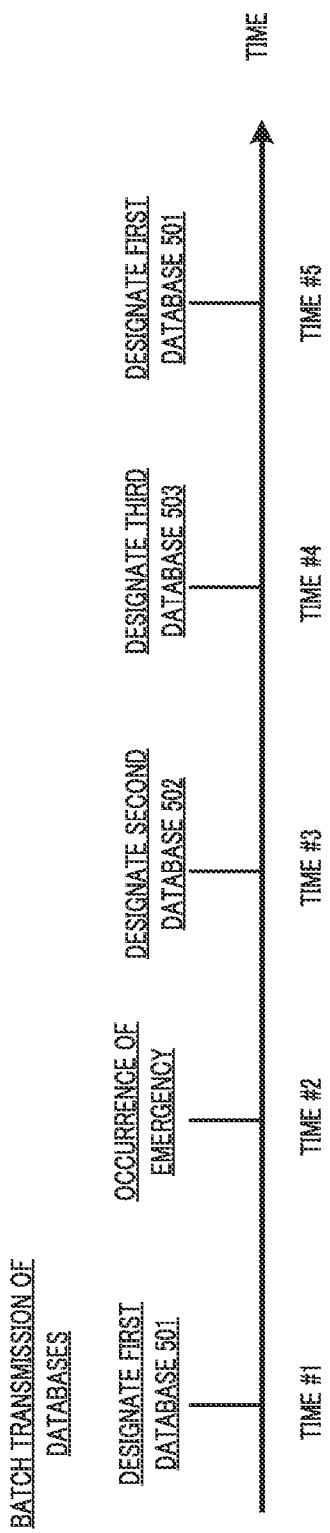
FIG. 6 illustrates a first example of an operation of transmitting the database by the first apparatus according to Embodiment 1.

FIG. 6 illustrates an exemplary operation along the time line in the case where first apparatus 102 in FIG. 1 transmits the databases at a time. Note that the horizontal axis indicates time in FIG. 6.

At time #1, first apparatus 102 in FIG. 1 transmits modulated signals including information corresponding to, for example, the databases of "first database 501, second database 502, and third database 503" in FIG. 5. Therefore, the databases are transmitted as a batch transmission.

In addition, first apparatus 102 in FIG. 1 transmits modulated signals including information that indicates "use of first database 501" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501".

Then, it is assumed that an emergency, such as a disaster, has occurred at time #2, for example.

Accordingly, at time #3, first apparatus 102 in FIG. 1 transmits modulated signals including information that indicates "use of second database 502" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "second database 502".

Then, at time #4, which is some time after time #3, first apparatus 102 in FIG. 1 transmits modulated signals including information that indicates "use of third database 503" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "third database 503".

For example, at time #5 when it is returned to the normal state, first apparatus 102 in FIG. 1 transmits modulated signals including information that indicates "use of first database 501" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501".

In this way, switching the communication methods based on the state of emergency produces the effect of increasing the probability of transmitting more appropriate data to users.

Note that, although first apparatus 102 performs the batch transmission of the databases at time #1 in FIG. 6, the batch transmission of the databases may be performed at another time as well. Accordingly, even when a terminal and/or a communication apparatus are newly added to FIG. 1, the new terminal and/or the new communication apparatus can obtain the databases, and this produces the effect of achieving the communication based on the databases.

Figure 7:
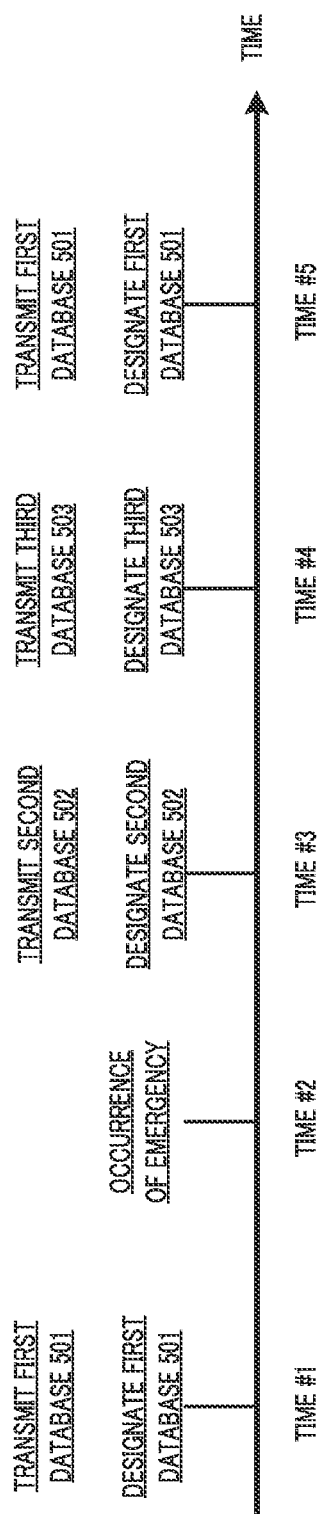
FIG. 7 illustrates a second example of the operation of transmitting the database by the first apparatus according to Embodiment 1.

FIG. 7 illustrates an exemplary operation along the time line in the case where first apparatus 102 in FIG. 1 transmits the databases one for each time. Note that the horizontal axis indicates time in FIG. 7.

At time #1, first apparatus 102 in FIG. 1 transmits modulated signals including information corresponding to, for example, the database of "first database 501" in FIG. 5.

In addition, first apparatus 102 in FIG. 1 transmits modulated signals including information that indicates "use of first database 501" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501".

Then, it is assumed that an emergency, such as a disaster, has occurred at time #2, for example.

Accordingly, at time #3, first apparatus 102 in FIG. 1 transmits modulated signals including information corresponding to the database of "second database 502" in FIG. 5.

At time #3, first apparatus 102 in FIG. 1 also transmits modulated signals including information that indicates "use of second database 502" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "second database 502".

Then, at time #4, which is some time after time #3, first apparatus 102 in FIG. 1 transmits modulated signals including information corresponding to the database of "third database 503" in FIG. 5.

At time #4, first apparatus 102 in FIG. 1 also transmits modulated signals including information that indicates "use of third database 503" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "third database 503".

For example, at time #5 when it is returned to the normal state, first apparatus 102 in FIG. 1 transmits modulated signals including information corresponding to the database of "first database 501" in FIG. 5.

At time #5, first apparatus 102 in FIG. 1 also transmits modulated signals including information that indicates "use of first database 501" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501".

In this way, switching the communication methods based on the state of emergency produces the effect of increasing the probability of transmitting more appropriate data to users.

Next, a configuration in FIG. 8, which is different from that in FIG. 5, will be described as an exemplary configuration of data 101, which is the database on communication methods and is taken as input by first apparatus 102, described in FIGS. 1 and 2.

As in FIG. 5, the database is composed of first database 501, second database 502, and third database 503 in FIG. 8. The following description is about a difference in FIG. 8 from FIG. 5.

First database 501, second database 502, and third database 503 include time information.

As illustrated in FIG. 8, first database 501 holds information that "first database 501 is valid except for exceptional times" as the time information.

Also as illustrated in FIG. 8, second database 502 holds information that "second database 502 is valid on May 1, 2019 and May 2, 2019" as the time information.

As illustrated in FIG. 8, third database 503 holds information that "third database 503 is valid on May 3, 2019" as the time information.

FIG. 9 illustrates an exemplary operation of first apparatus 102 in FIG. 1 transmitting the databases along the time line. Note that the horizontal axis indicates time in FIG. 9.

At time #1, first apparatus 102 in FIG. 1 transmits modulated signals including information corresponding to the database of "first database 501" in FIG. 8 to "terminal #1 with 103_1, terminal #2 with 103_2, terminal #3 with 103_3, terminal #4 with 103_4, communication apparatus 1 with 104_3, communication apparatus 2 with 104_2, and communication apparatus 3 with 104_3 in FIG. 1". This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501".

Then, it is assumed that an emergency, such as a disaster, has occurred at time #2 on Apr. 30, 2019, for example.

Accordingly, at time #3, first apparatus 102 in FIG. 1 transmits modulated signals including information corresponding to a database composed of "first database 501, second database 502, and third database 503 in FIG. 8" or transmits modulated signals including information corresponding to a database composed of "second database 502 and third database 503 in FIG. 8" to "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1".

This causes terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 to perform communication based on the database of "first database 501, second database 502, and third database 503 in FIG. 8".

For example, on May 1, 2019 and May 2, 2019, terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 perform communication based on second database 502 in FIG. 8.

On May 3, 2019, terminal with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 perform communication based on third database 503 in FIG. 8.

From May 4, 2019 onward, terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1 perform communication based on first database 501 in FIG. 8.

In this way, switching the communication methods based on the state of emergency produces the effect of increasing the probability of transmitting more appropriate data to users.

Note that, in FIG. 9, first apparatus 102 performs the transmission of first database 501 in FIG. 8 at time #1, but the transmission of first database 501 may be performed at another time as well. Accordingly, even when a terminal and/or a communication apparatus are newly added to FIG. 1, the new terminal and/or the new communication apparatus can obtain the database, and this produces the effect of achieving the communication based on the databases.

Although the database in FIG. 8 is composed of the three types of databases (first database 501, second database 502, and third database 503), the same can be implemented with one or more types or two or more types of databases. In addition, although FIG. 8 illustrates the example of holding the databases for area A and area B, the database need not include area information or may be configured to hold databases for one or more areas or two or more areas.

Further, although the database in FIG. 8 is composed of the databases for the first frequency band, the database may be composed of databases for a plurality of frequency bands. Furthermore, the three communication methods are available in the first frequency band in the above description, but the same can be implemented with one or more available communication methods or two or more available communication methods.

The method of configuring the time information is not limited to the example in FIG. 8, and the same can be obviously implemented by another method of configuring the time information.

The following is a supplementary description of the embodiment described above.

In the configurations of the databases in FIGS. 5 and 8, second database 502 is described as the one for the emergency broadcasting priority mode. Thus, the third communication method may be, for example, a broadcast communication method or a multicast communication method. This has the advantage of providing appropriate information to many terminals, that is, many users.

In the configurations of the databases in FIGS. 5 and 8, third database 503 is described as the one for the communication priority mode. Thus, in third database 503, for example, the communication (e.g., unicast) time is configured to be longer than the broadcast (or multicast) time in order to prioritize communication. This provides an environment where each user can easily communicate with another user after emergency broadcasting.

The database may have a characteristic of including the normal mode so that the normal mode is used except for a special case, such as the mode change in FIGS. 6, 7, and 9.

The databases in FIGS. 5 and 8, however, are merely examples, and second database 502 need not indicate the emergency broadcasting priority mode. Likewise, third database 503 need not indicate the communication priority mode, and first database 501 need not indicate the normal mode, in FIGS. 5 and 8.

Additionally, it is conceivable that at least one of first database 501, second database 502, and third database 503 in the databases in FIGS. 5 and 8 is configured to include a cellular communication method, and/or that at least one of first database 501, second database 502, and third database 503 is configured to include a wireless LAN communication method.

In this case, it may be preferable in some cases that the third communication method in the first frequency band is the cellular communication method in FIGS. 5 and 8. Then, configuring the third communication method to be multicast (or broadcast) has the advantage of providing appropriate information to many terminals, that is, many users. Meanwhile, not configuring the third communication method to be multicast allows the users of the terminals to obtain information from appropriate access points, thereby producing the effect of increasing the probability for the users to obtain more information.

In the databases in FIGS. 5 and 8, the first communication method is different from the second communication method, the second communication method is different from the third communication method, and the first communication method is different from the third communication method. Note that whether one or more of the following is satisfied, for example, is considered to be a method of differentiating between communication method #A and communication method 4B:

"The communication methods themselves are different from each other";

"A channel spacing in communication method #A is different from a channel spacing in communication method #B";

"An error correction code available for communication method #A is different from an error correction code available for communication method #B (the error correction codes themselves may be different, or the code lengths (block lengths) of the error correction codes may be different)";

"The maximum frequency band available for communication method #A is different from the maximum frequency band available for communication method #B";

"A subcarrier spacing available for communication method #A in Orthogonal Frequency Division Multiplexing (OFDM) is different from a subcarrier spacing available for communication method #B in OFDM";

"A code rate of an error correction code supported in communication method #A is partly different from a code rate of an error correction code supported in communication method #B"; and "For a terminal, a communication counterpart by communication method #A is different from a communication counterpart by communication method #B".

Next, an exemplary method of transmitting the database will be described. For example, the contents of first database 501 in FIG. 5 are shared by "first apparatus 102 in FIG. 1" and "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". Likewise, the contents of second database 502 in FIG. 5 are shared by "first apparatus 102 in FIG. 1" and "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1". Also, the contents of third database 503 in FIG. 5 are shared by "first apparatus 102 in FIG. 1" and "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1".

In addition, a "database identification number" of first database 501 in FIG. 5 is set to "0", a "database identification number" of second database 502 is set to "1", and a "database identification number" of third database 503 is set to "2".

Then, for example, first apparatus 102 transmits information of the "database identification number" to communication counterparts, which are "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1", for example, and the communication counterparts can know the database information by obtaining the information of the "database identification number".

This can be implemented in the same way in a case of using the database in FIG. 8.

Meanwhile, the database in FIG. 8 includes the time information. In this case, for example, first apparatus 102 in FIG. 1 transmits the "database identification number" and the "time information" to communication counterparts, which are "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1", for example, and the communication counterparts can obtain the database information and the time information.

Note that the method of sharing the database information is not limited to the above-described example. For example, the database information may be held by a server, and the database information may be shared by the devices accessing the database information on the server. It is possible to have the effects described in the present embodiment as long as the database information is shared by "first apparatus 102 in FIG. 1" and "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1".

Although the exemplary configurations of the database are described in FIGS. 5 and 8, exemplary configurations of the database other than those in FIGS. 5 and 8 will be further described.

FIG. 10 illustrates an exemplary configuration of the database, and the database is composed of first database 501, second database 502, and third database 503 as in FIG. 5. The following description is about a difference between the databases in FIGS. 10 and 5.

The database in FIG. 10 is different from the database in FIG. 5 in that "second database 502 includes the database in dotted lines 1001".

Second database 502 has the following database in addition to Case 2-A-1 and Case 2-B-1.

Case 2-A-2:
This is a database for area A and the following rule applies.
With less than or equal to first transmission power, the second communication method is available in the first frequency band all day.

Case 2-B-2:
   This is a database for area B and the following rule applies.
   With less than or equal to the first transmission power, the second communication method is available in the first frequency band all day.

As described above, the database may include information on the transmission power. Note that how the database includes the information on the transmission power is not limited to the example in FIG. 10.

FIG. 11 illustrates an exemplary configuration of the database, and the database is composed of first database 501, second database 502, and third database 503 as in FIG. 5. The following description is about a difference between the databases in FIGS. 11 and 5.

The database in FIG. 11 is different from the database in FIG. 5 in that "second database 502 includes the database in dotted lines 1101".

Second database 502 has the following database in addition to Case 2-A-1 and Case 2-B-1.
Case 2-A-2:
   This is a database for area A and the following rule applies.
   The second communication method is available indoors in the first frequency band all day.
Case 2-B-2:
   This is a database for area B and the following rule applies.
   The second communication method is available indoors in the first frequency band all day.

As described above, the database may include information on the location restriction. Note that how the database includes the information on the location restriction is not limited to the example in FIG. 11.

FIG. 12 illustrates an exemplary configuration of the database, and the database is composed of first database 501, second database 502, and third database 503 as in FIG. 5. The following description is about a difference between the databases in FIGS. 12 and 5.

The database in FIG. 12 is different from the database in FIG. 5 in that "second database 502 includes the database in dotted lines 1201".

Second database 502 has the following database in addition to Case 2-A-1 and Case 2-B-1.
Case 2-A-2:
   This is a database for area A and the following rule applies.
   With less than or equal to first transmission power, the second communication method is available indoors in the first frequency band all day.
Case 2-B-2:
   This is a database for area B and the following rule applies.
   With less than or equal to the first transmission power, the second communication method is available indoors in the first frequency band all day.

As described above, the database may include information on the transmission power and information on the location restriction. Note that how the database includes the information on the transmission power and the information on the location restriction is not limited to the example in FIG. 12.

The following description is about another embodiment. For example, in the above description, it is assumed that the first frequency band is the 6 GHz band, the second communication method is a wireless Local Area Network (LAN) communication method, and the third communication method is a cellular communication method (e.g., Third Generation Partnership Project (3GPP) New Radio (NR) unlicensed band). Note that the first communication method is different from the second communication method, and the first communication method is also different from the third communication method.

Figure 13:
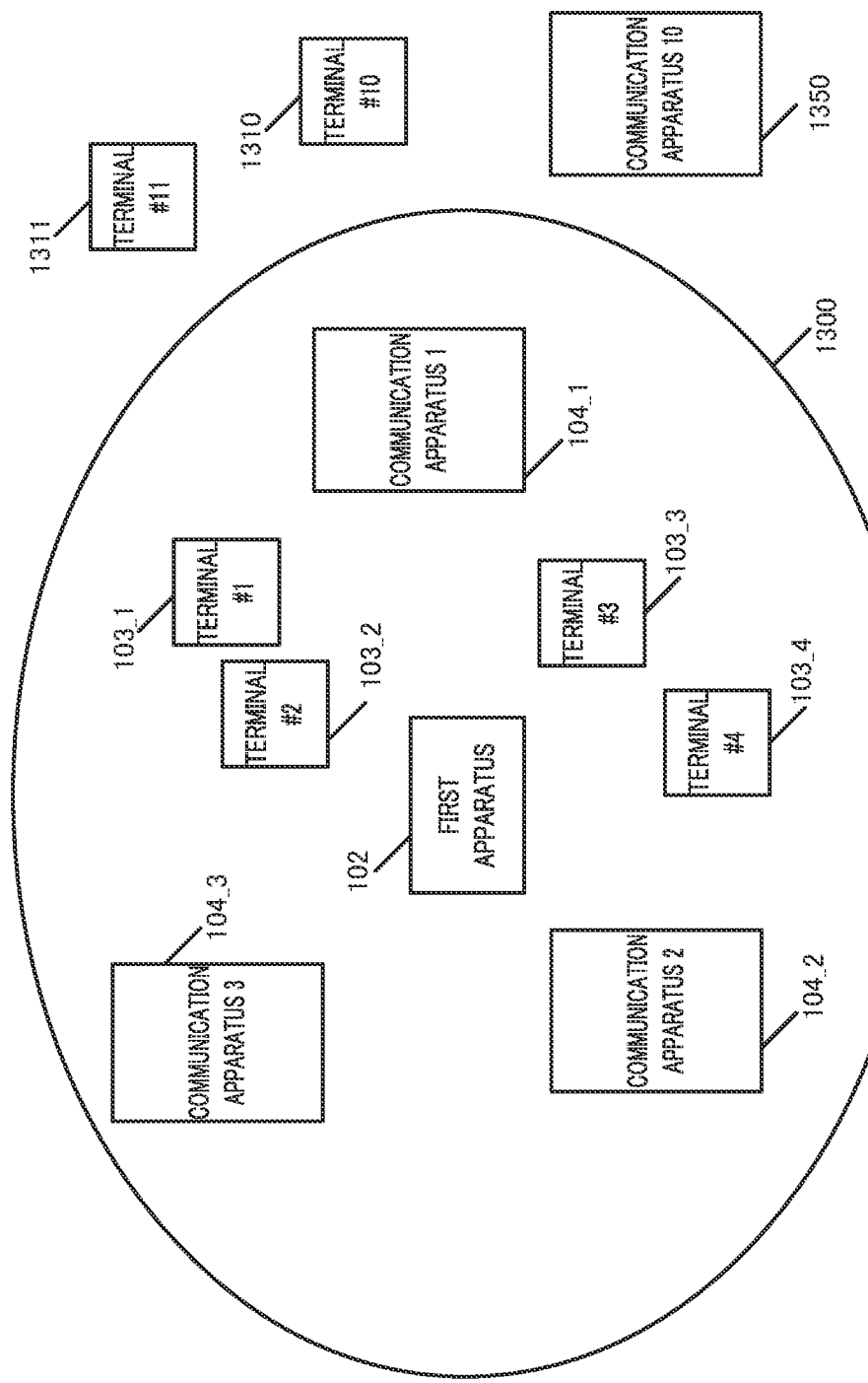
FIG. 13 illustrates an exemplary positional relationship between the first apparatus, the terminals, and the communication apparatuses according to Embodiment 1.

FIG. 13 illustrates a positional relationship between "the first apparatus, terminals, and communication apparatuses illustrated in FIG. 1", terminal #10 with 1310, terminal #11 with 1311, and communication apparatus 10 with 1350.

As described with reference to FIG. 1, first apparatus 102 transmits modulated signals including the database, and the modulated signals are receivable in an area within closed loop 1300 in FIG. 13. Thus, "terminal #1 with 103_3, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1" can receive the modulated signals transmitted by first apparatus 102.

Meanwhile, terminal #10 with 1310, terminal #11 with 1311, and communication apparatus 10 with 1350 in FIG. 13 are not present in the area within closed loop 1300. They thus fail to receive the modulated signals transmitted by first apparatus 102, and fail to obtain the database accordingly. This prevents terminal #10 with 1310, terminal #11 with 1311, and communication apparatus 10 with 1350 from performing communication based on the database.

Thus, there arises a problem that transmissions of modulated signals in the 6 GHz band, which is the first frequency band, by terminal #10 with 1310, terminal #11 with 1311, and communication apparatus 10 with 1350 are more likely to interfere with "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1".

To solve the problem, a description will be given of methods of transmitting modulated signals including the database by "terminal #1 with 103_1, terminal #2 with 103_2, terminal #3 with 103_3, terminal #4 with 103_4, communication apparatus 1 with 104_1, communication apparatus 2 with 104_2, and communication apparatus 3 with 104_3 in FIG. 1" capable of receiving the modulated signals transmitted by first apparatus 102.

By way of example, it is assumed that "communication apparatus 1 with 104_1, communication apparatus 2 with 104_2, and communication apparatus 3 with 104_3" are wireless LAN access points. The following is a description of an embodiment in that case.

First, a description will be given of a case where "communication apparatus 1 with 104_1, communication apparatus 2 with 104_2, and communication apparatus 3 with 104_3" transmit the modulated signals including the database by using the modulated signals in the 6 GHz band, which is the first frequency band.

Note that first apparatus 102 transmits the "database and accompanying data" using the methods described in FIGS. 5 to 12.

It is assumed that "communication apparatus 1 with 104_1, communication apparatus 2 with 104_2, and communication apparatus 3 with 104_3" have received the modulated signals transmitted by first apparatus 102, and obtained the "database and accompanying data". Accordingly, "communication apparatus 1 with 104_1, communication apparatus 2 with 104_2, and communication apparatus 3 with 104_3" generate and transmit modulated signals including the "database and accompanying data" for a "wireless LAN communication method, which is the second communication method, in the 6 GHz band, which is the first frequency band".

Figure 14:
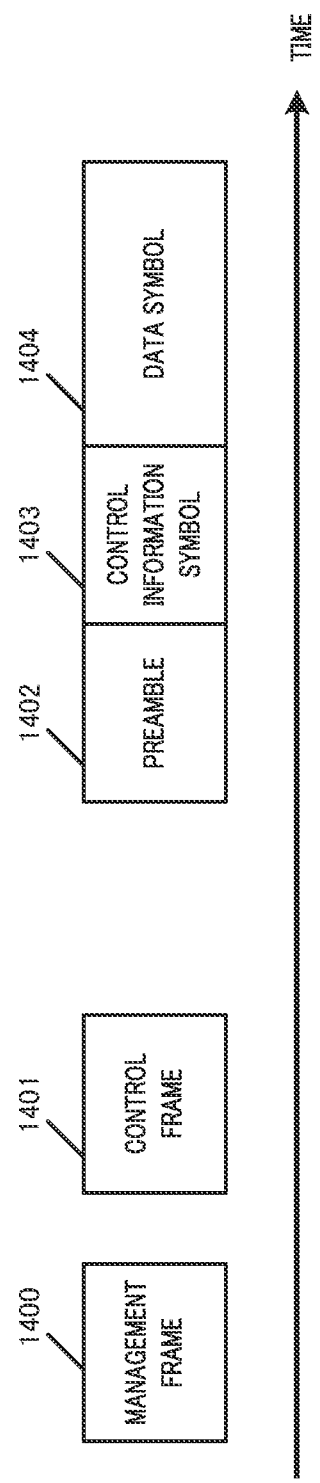
FIG. 14 illustrates a first example of a frame configuration in a wireless LAN communication method according to Embodiment 1.

FIG. 14 illustrates an exemplary configuration of a frame of the modulated signal for the "wireless LAN communication method, which is the second communication method, in the 6 GHz band, which is the first frequency band". Note that the horizontal axis indicates time in FIG. 14.

In FIG. 14, management frame 1400 is a Medium Access Control (MAC) management frame. Control frame 1401 is a MAC control frame. Preamble 1402 is a symbol for a communication counterpart to perform signal detection, frequency synchronization, frequency offset estimation, time synchronization, and channel estimation. Control information symbol 1403 is a symbol for transmitting information on a method of transmitting data symbol 1404, such as an error correction encoding scheme (e.g., an error correction code, a code length (block length), and a code rate that are being used), a modulation scheme, and a transmission method (e.g., the number of transmission streams). Data symbol 1404 is a symbol for transmitting data.

"Communication apparatus 1 with 104_1, communication apparatus 2 with 104_2, and communication apparatus 3 with 104_3" transmit the "database and accompanying data" obtained from first apparatus 102 in any one or more of the regions, which are "management frame 1400, control frame 1401, control information symbol 1403, and data symbol 1404 in FIG. 14".

Therefore "communication apparatus 1 with 104_1, communication apparatus 2 with 104_2, and communication apparatus 3 with 104_3" may transmit the "database and accompanying data" in management frame 1400, control frame 1401, control information symbol 1403, and/or data symbol 1404 in FIG. 14.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 then perform communication in the first frequency band based on the database. This reduces the interference between the devices in the first frequency band, thereby having the effect of gaining high data reception quality.

For example, especially when "communication apparatus 1 with 104_1, communication apparatus 2 with 104_2, and communication apparatus 3 with 104_3" transmit the "database and accompanying data" in management frame 1400 such as a beacon, the above-mentioned effect is more likely to be achieved due to the high transmission frequency. Note that the similar effect can be achieved with management frame 1400 other than the beacon.

Note that communication apparatus 1 with 104_1, communication apparatus 2 with 104_2, and communication apparatus 3 with 104_3 may be wireless LAN terminals or wireless LAN repeaters (mesh nodes).

Next, another example will be described, which is a case where "communication apparatus 1 with 104_1, communication apparatus 2 with 104_2, and communication apparatus 3 with 104_3" transmit the modulated signals including the database by using the modulated signals in the second frequency band, which is different from the first frequency band.

Note that first apparatus 102 transmits the "database and accompanying data" using the methods described in FIGS. 5 to 12.

It is assumed that "communication apparatus 1 with 104_1, communication apparatus 2 with 104_2, and communication apparatus 3 with 104_3" have received the modulated signals transmitted by first apparatus 102, and obtained the "data base and accompanying data". Accordingly, "communication apparatus 1 with 104_1, communication apparatus 2 with 104_2, and communication apparatus 3 with 104_3" generate and transmit modulated signals including the "database and accompanying data" for a "wireless LAN communication method in the second frequency band, which is different from the first frequency band". The second frequency band includes the 2.4 GHz band, 5 GHz band, and 60 GHz band, for example, but is not limited to these frequency bands. Note that a "device for generating and transmitting the modulated signals for the wireless LAN communication method in the second frequency band, which is different from the first frequency band" is included in another communication apparatus 399 in FIG. 4.

FIG. 14 is considered to illustrate an exemplary configuration of a frame of the modulated signal for the "wireless LAN communication method in the second frequency hand". Note that the horizontal axis indicates time in FIG. 14. Note that the detailed description of FIG. 14 is omitted since it has already been described.

"Communication apparatus 1 with 104_1, communication apparatus 2 with 104_2, and communication apparatus 3 with 104_3" transmit the "database and accompanying data" obtained from first apparatus 102 in any one or more of the regions, which are "management frame 1400, control frame 1401, control information symbol 1403, and data symbol 1404 in FIG. 14", in the second frequency band.

Therefore, "communication apparatus 1 with 104_1, communication apparatus 2 with 104_2, and communication apparatus 3 with 104_3" may transmit the "database and accompanying data" in management frame 1400, control frame 1401, control information symbol 1403, and/or data symbol 1404 in FIG. 14.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 then perform communication in the first frequency band based on the database. This reduces the interference between the devices in the first frequency band, thereby having the effect of gaining high data reception quality.

For example, especially when "communication apparatus 1 with 104_#, communication apparatus 2 with 104_2, and communication apparatus 3 with 104_3" transmit the "database and accompanying data" in management frame 1400 such as a beacon, the above-mentioned effect is more likely to be achieved due to the high transmission frequency. Note that the similar effect can be achieved with management frame 1400 other than the beacon.

Note that communication apparatus 1 with 104_1, communication apparatus 2 with 104_2, and communication apparatus 3 with 104_3 may be wireless LAN terminals or wireless LAN repeaters (mesh nodes).

Next, "terminal #1 with 103_1, terminal #2 with 103_2, terminal #3 with 103_3, and terminal #4 with 103_4" are considered to be wireless LAN terminals, and the following description is about embodiments in that case.

First, a description will be given of a case where "terminal #1 with 103_1, terminal #2 with 103_2, terminal #3 with 103_3, and terminal #4 with 103_4" transmit the modulated signals including the database by using the modulated signals in the 6 GHz band, which is the first frequency band.

Note that first apparatus 102 transmits the "database and accompanying data" using the methods described in FIGS. 5 to 12.

It is assumed that "terminal #1 with 103_1, terminal #2 with 103_2, terminal #3 with 103_3, and terminal #4 with 103_4" have received the modulated signals transmitted by first apparatus 102, and obtained the "data base and accompanying data". Accordingly, "terminal #1 with 103_1, terminal #2 with 103_2, terminal #3 with 103_3, and terminal #4 with 103_4" generate and transmit modulated signals including the "database and accompanying data" for a "wireless LAN communication method, which is the second communication method, in the 6 GHz band, which is the first frequency band".

Figure 15:
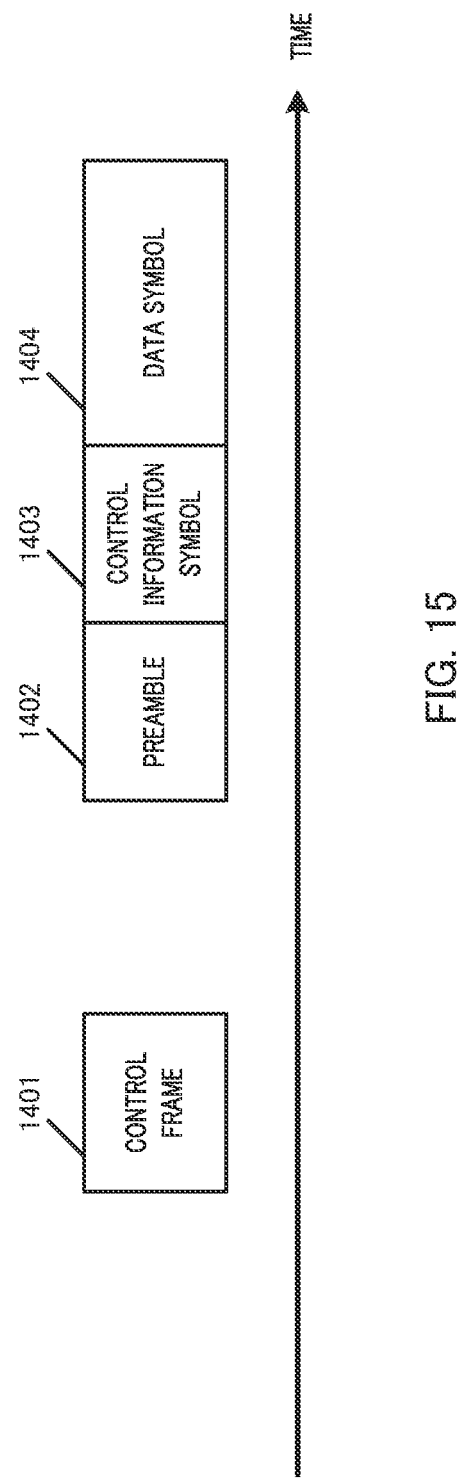
FIG. 15 illustrates a second example of the frame configuration in the wireless LAN communication method according to Embodiment 1.

FIG. 15 illustrates an exemplary configuration of a frame of the modulated signal for the "wireless LAN communication method, which is the second communication method, in the 6 GHz band, which is the first frequency band". Note that the horizontal axis indicates time in FIG. 15.

In FIG. 15, components that operate in the same way as in FIG. 14 are denoted by the same reference signs, and descriptions thereof are omitted. Management frame 1400 is not present in FIG. 15, and this is the difference from FIG. 14.

"Terminal #1 with 103_1, terminal #2 with 103_2, terminal #3 with 103_3, and terminal #4 with 103_4" transmit the "database and accompanying data" obtained from first apparatus 102 in one or more of the regions, which are control frame 1401, control information symbol 1403, and data symbol 1404 in FIG. 15.

Therefore, "terminal #1 with 103_1, terminal #2 with 103_2, terminal #3 with 103_3, and terminal #4 with 103_4" may transmit the "database and accompanying data" in control frame 1401, control information symbol 1403, and/or data symbol 1404 in FIG. 15.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 then perform communication in the first frequency band based on the database. This reduces the interference between the devices in the first frequency band, thereby having the effect of gaining high data reception quality.

Note that terminal #1 with 103_1, terminal #2 with 103_2, terminal #3 with 103_3, and terminal #4 with 103_4 may be wireless LAN access points or wireless LAN repeaters (mesh nodes).

As another example, a description will be given of a case where "terminal #1 with 103_1, terminal #2 with 103_2, terminal #3 with 103_3, and terminal #4 with 103_4" transmit the modulated signals including the database by using the modulated signals in the second frequency band, which is different from the first frequency band.

Note that first apparatus 102 transmits the "database and accompanying data" using the methods described in FIGS. 5 to 12.

It is assumed that "terminal #1 with 103_1, terminal #2 with 103_2, terminal #3 with 103_3, and terminal #4 with 103_4" have received the modulated signals transmitted by first apparatus 102, and obtained the "data base and accompanying data". Accordingly, "terminal #1 with 103_1, terminal #2 with 103_2, terminal #3 with 103_3, and terminal #4 with 103_4" generate and transmit modulated signals including the "database and accompanying data" for a "wireless LAN communication method in the second frequency band, which is different from the first frequency band". The second frequency band includes the 2.4 GHz band, 5 GHz band, and 60 GHz band, for example, but is not limited to these frequency bands. Note that a "device for generating and transmitting the modulated signals for the wireless LAN communication method in the second frequency band, which is different from the first frequency band" is included in another communication apparatus 399 in FIG. 4.

FIG. 15 is considered to illustrate an exemplary configuration of a frame of the modulated signal for the "wireless LAN communication method in the second frequency band." Note that the horizontal axis indicates time in FIG. 15. Note that the detailed description of FIG. 15 is omitted since it has already been described.

"Terminal #1 with 103_1, terminal #2 with 103_2, terminal #3 with 103_3, and terminal #4 with 103_4" transmit the "database and accompanying data" obtained from first apparatus 102 in any one or more of the regions, which are "control frame 1401, control information symbol 1403, and data symbol 1404 in FIG. 15", in the second frequency band.

Therefore. "terminal #1 with 103_1, terminal #2 with 103_2, terminal #3 with 103_3, and terminal #4 with 103_4" may transmit the "database and accompanying data" in control frame 1401, control information symbol 1403, and/or data symbol 1404 in FIG. 15.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 then perform communication in the first frequency band based on the database. This reduces the interference between the devices in the first frequency band, thereby having the effect of gaining high data reception quality.

Note that communication apparatus 1 with 104_1, communication apparatus 2 with 104_2, and communication apparatus 3 with 104_3 may be wireless LAN terminals or wireless LAN repeaters (mesh nodes).

Note that the management frame described above includes, but is not limited to, a Beacon frame, a Probe request frame, an Association request frame, an Association response frame, a Disassociation frame, an Authentication frame, a De-authentication frame, and an Action frame, for example.

Further, the control frame includes, but is not limited to, a Request to Send (RTS) frame, an Acknowledgement (ACK) frame, a Block ACK request frame, and a Block ACK frame, for example.

As another example, it is assumed that "communication apparatus 1 with 104_1, communication apparatus 2 with 104_2, and communication apparatus 3 with 104_3" are cellular base stations or access points. The following descriptions are about embodiments in that case.

First, a description will be given of a case where "communication apparatus 1 with 104_1, communication apparatus 2 with 104_2, and communication apparatus 3 with 104_3" transmit the modulated signals including the database by using the modulated signals in the 6 GHz band, which is the first frequency band.

Note that first apparatus 102 transmits the "database and accompanying data" using the methods described in FIGS. 5 to 12.

It is assumed that "communication apparatus 1 with 104_1, communication apparatus 2 with 104_2, and communication apparatus 3 with 104_3" have received the modulated signals transmitted by first apparatus 102, and obtained the "data base and accompanying data". Accordingly, "communication apparatus 1 with 104_1, communication apparatus 2 with 104_2, and communication apparatus 3 with 104_3" generate and transmit modulated signals including the "database and accompanying data" for a "cellular communication method, which is the second communication method, in the 6 GHz band, which is the first frequency band".

Communication apparatus 1 with 104_1, communication apparatus 2 with 104_2, and communication apparatus 3 with 104_3 transmit the "database and accompanying data" obtained from first apparatus 102 in one or more of regions, which are "a region for downlink broadcast information and a region for downlink paging".

Therefore, "communication apparatus 1 with 104_1, communication apparatus 2 with 104_2, and communication apparatus 3 with 104_3" may transmit the "database and accompanying data" in the region for downlink broadcast information and/or in the region for downlink paging.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 perform communication in the first frequency band based on the database. This reduces the interference between the devices in the first frequency band, thereby having the effect of gaining high data reception quality.

Although in the above, the example where "the region for downlink broadcast information and the region for downlink paging" are used have been described, the region or symbol where the "database and accompanying data" are transmitted is not limited thereto.

Note that communication apparatus 1 with 104_1, communication apparatus 2 with 104_2, and communication apparatus 3 with 104_3 may be repeaters (mesh nodes).

Next, another example will be described, which is a case where "communication apparatus 1 with 104_1, communication apparatus 2 with 104_2, and communication apparatus 3 with 104_3" transmit the modulated signals including the database by using the modulated signals in the second frequency hand, which is different from the first frequency hand.

Note that first apparatus 102 transmits the "database and accompanying data" using the methods described in FIGS. 5 to 12.

It is assumed that "communication apparatus 1 with 104_1, communication apparatus 2 with 104_2, and communication apparatus 3 with 104_3" have received the modulated signals transmitted by first apparatus 102, and obtained the "database and accompanying data". Accordingly, "communication apparatus 1 with 104_1, communication apparatus 2 with 104_2, and communication apparatus 3 with 104_3" generate and transmit modulated signals including the "database and accompanying data" for a "cellular communication method in the second frequency band, which is different from the first frequency band". Note that a "device for generating and transmitting the modulated signals for the wireless LAN communication method in the second frequency band, which is different from the first frequency band" is included in another communication apparatus 399 in FIG. 4.

"Communication apparatus 1 with 104_1, communication apparatus 2 with 104_2, and communication apparatus 3 with 104_3" transmit the "database and accompanying data" obtained from first apparatus 102 in one or more of the regions, which are "the region for downlink broadcast information and the region for downlink paging".

Therefore, "communication apparatus 1 with 104_1, communication apparatus 2 with 104_2, and communication apparatus 3 with 104_3" may transmit the "database and accompanying data" in the region for downlink broadcast information and/or in the region for downlink paging.

"Terminal #10 with 1310, terminal #11 with 1311, and communication apparatus 10 with 1350" in FIG. 13 can possibly obtain the "database and accompanying data" by receiving the modulated signals, for example, and "terminal #10 with 1310, terminal #11 with 1311, and communication apparatus 10 with 1350" in FIG. 13 perform communication in the first frequency band based on the database. This reduces the interference between the devices in the first frequency band, thereby having the effect of gaining high data reception quality.

Although in the above, the example where "the region for downlink broadcast information and the region for downlink paging" are used has been described, the region or symbol where the "database and accompanying data" are transmitted is not limited thereto.

Note that communication apparatus 1 with 104_1, communication apparatus 2 with 104_2, and communication apparatus 3 with 104_3 may be repeaters (mesh nodes).

In some of the examples described above, the first frequency band is described as the 6 GHz band, but the frequency band of the first frequency band is not limited to the 6 GHz band.

Note that terminal #10 with 1310, terminal #11 with 1311, and communication apparatus 10 with 1350 in FIG. 13 may transmit modulated signals including the "database and accompanying data" obtained as described above. A method of transmitting the modulated signals including the "database and accompanying data" by terminal #10 with 1310, terminal #11 with 1311, and communication apparatus 10 with 1350 in FIG. 13 may be performed in the same manner as the methods of transmitting the modulated signals including the "database and accompanying data" by "terminal #1 with 103_1, terminal with 103_2, terminal #3 with 103_3, terminal #4 with 103_4, communication apparatus 1 with 104_1, communication apparatus 2 with 104_2, and communication apparatus 3 with 104_3 in FIG. 1" as described above.

Repeating the transmission of the "database and accompanying data" in this manner may be regarded as multi-hop communication of the "database and accompanying data".

Embodiment 2

Figure 16:
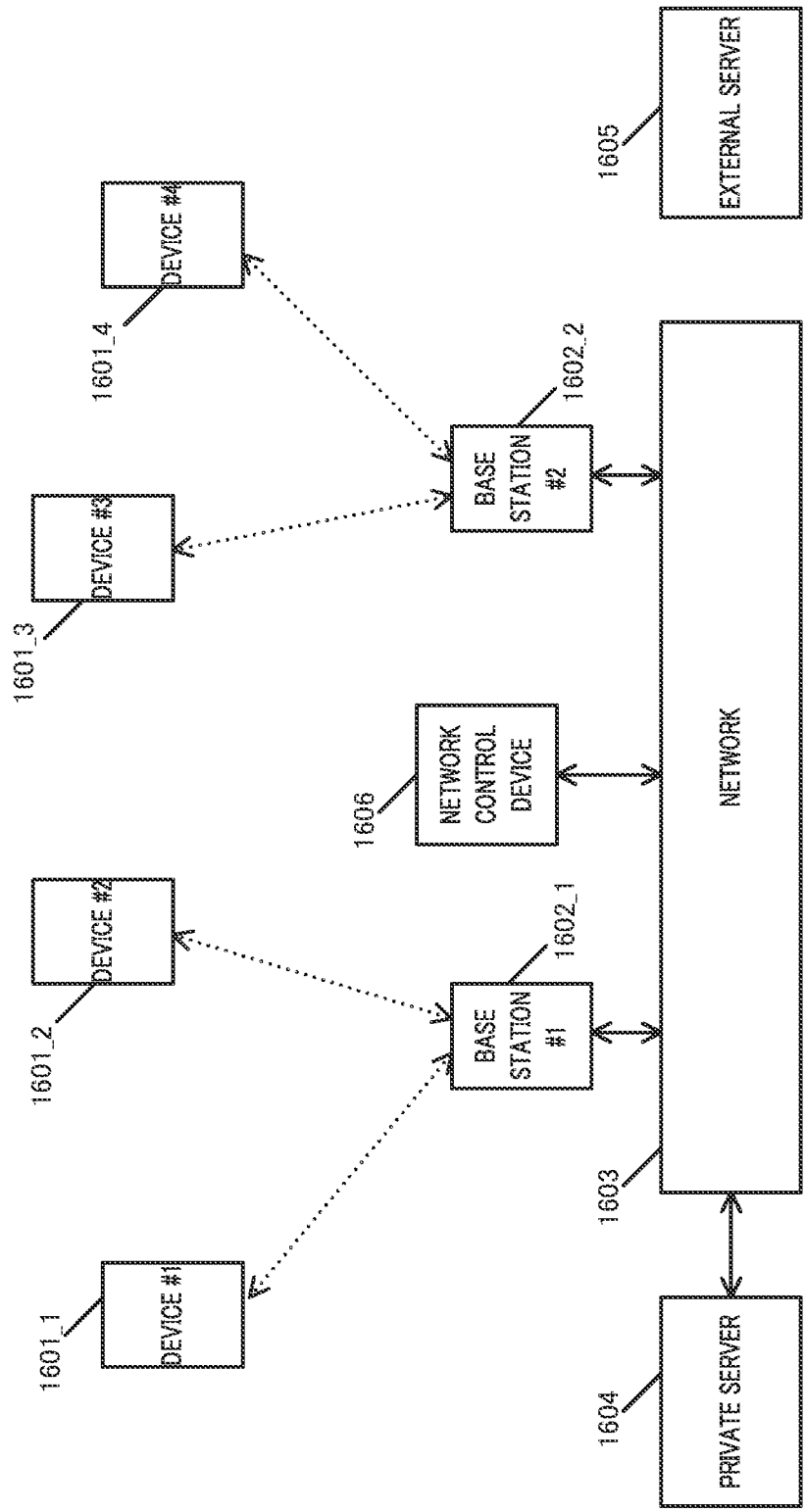
FIG. 16 illustrates a first example of a configuration of a system according to Embodiment 2.

In the present embodiment, examples different from Embodiment 1 will be described. FIG. 16 illustrates an exemplary configuration of a system. Although not illustrated in FIG. 16, first apparatus 102 in FIG. 1, for example, takes data 101, which is a database on communication, as input, and transmits the database to "device #1 with 1601_1, device #2, with 1601_2, device #3 with 1601_3, and device #4 with 1601_4", "base station #1 with 1602_1 and base station #2 with 1602_2" "network control device 1606", and "private server 1604" illustrated in FIG. 16. Note that first apparatus 102 may or may not transmit the database to external server 1605. First apparatus 1112 here may perform wired communication or radio communication.

In FIG. 16, device #1 with 1601_1 performs radio (or may be wired) communication with base station #1 with 1602_1, for example. Likewise, device #2 with 1601_2 performs radio (or may be wired) communication with base station #1 with 1602_1, for example.

Device #3 with 1601_3 performs radio (or may be wired) communication with base station #2 with 1602_2, for example. Likewise, device #4 with 1601_4 performs radio (or may be wired) communication with base station #2 with 1602_2, for example.

Network control deuce. 1606 performs communication with devices that form network 1603. In the case of FIG. 16, network control device 1606 controls the network so that base station #1 with 1602_1 and base station #2 with 1602_2 communicate with private server 1604.

Thus, base station #1 with 1602_1 communicates with private server 1604 via network 1603, and base station #2 with 1602_2 also communicates with private server 1604 via network 1603.

Figure 17:
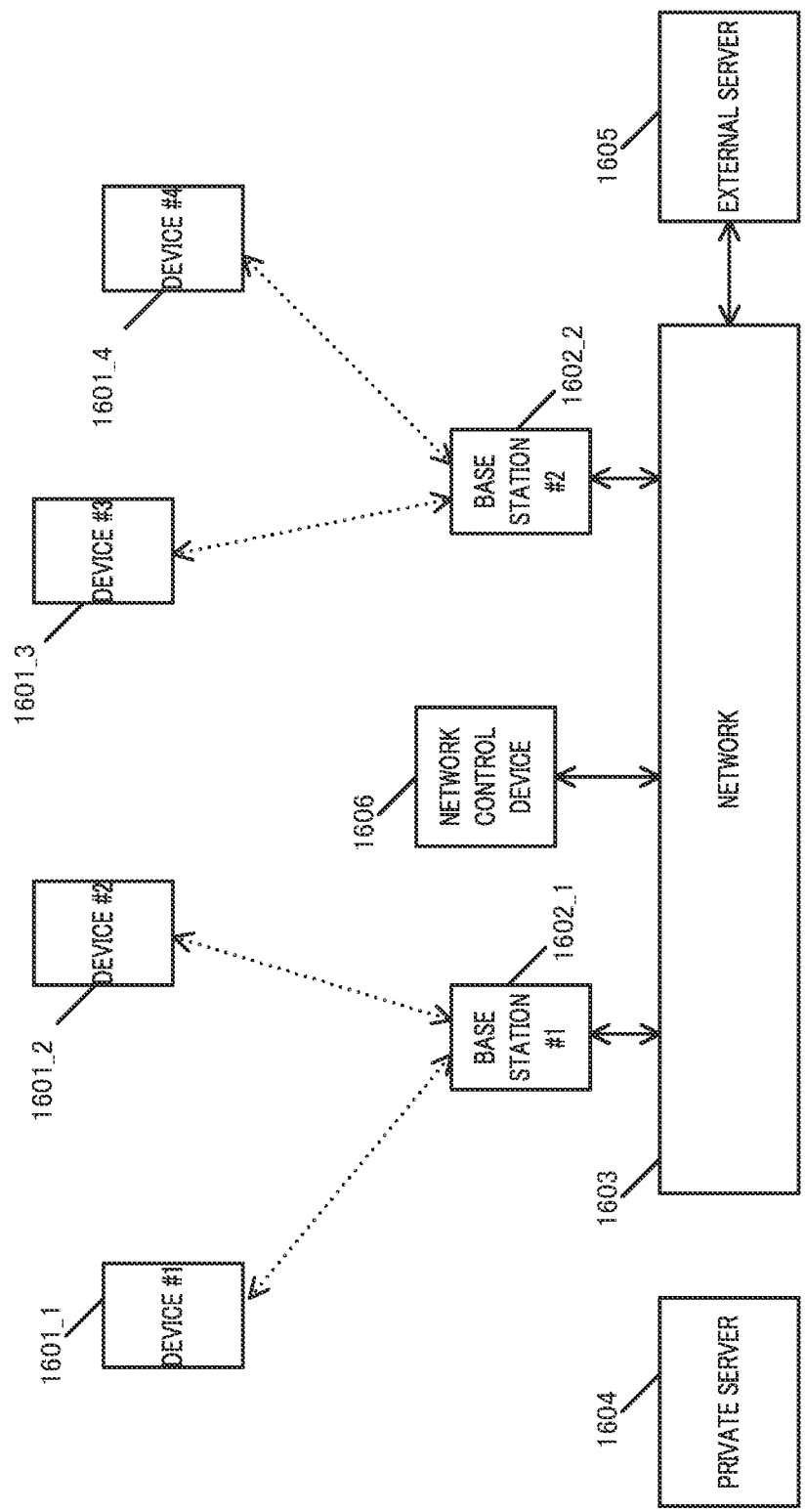
FIG. 17 illustrates a second example of the configuration of the system according to Embodiment 2.

FIG. 17 illustrates an exemplary configuration of the system in a state different from FIG. 16. Although not illustrated in FIG. 17, first apparatus 102 in FIG. 1, for example, takes data 101, which is a database on communication, as input, and transmits the database to "device #1 with 1601_1, device #2 with 1601_2, device #3 with 1601_3, and device #4 with 1601_4", "base station #1 with 1602_1 and base station #2 with 1602_2" "network control device 1606", and "private server 1604" illustrated in FIG. 17. Note that first apparatus 102 may or may not transmit the database to external server 1605. First apparatus 102 here may perform wired communication or radio communication.

In FIG. 17, device #1 with 1601_1 performs radio (or may be wired) communication with base station #1 with 1602_1, for example. Likewise, device #2 with 1601_2 performs radio (or may be wired) communication with base station #1 with 1602_1, for example.

Device #3 with 1601_3 performs radio (or may be wired) communication with base station #2 with 1602_2, for example. Likewise, device #4 with 1601_4 performs radio (or may be wired) communication with base station #2 with 1602_2, for example.

Network control device 1606 performs communication with devices that form network 1603. In the case of FIG. 17, network control device 1606 controls the network so that base station #1 with 1602_1 and base station #2 with 1602_2 communicate with external server 1605.

Thus, base station #1 with 1602_1 communicates with external server 1605 via network 1603, and base station #2 with 1602_2 also communicates with external server 1605 via network 1603.

Next, FIG. 18 will be described as an exemplary configuration of the database on communication, which is taken as input by first apparatus 102 present in FIGS. 16 and 17.

Figure 18:
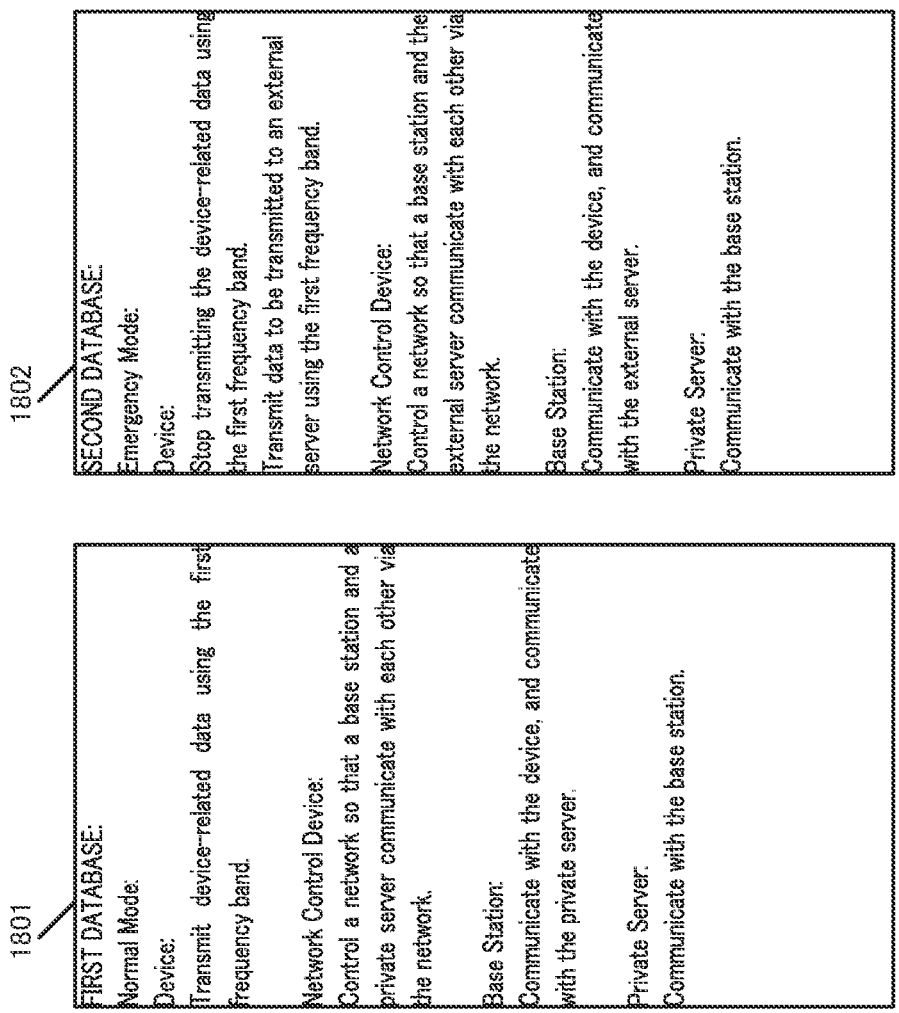
FIG. 18 illustrates a first example of a database according to Embodiment 2.

The database on communication is composed of two types of databases, which are first database 1801 and second database 1802, as in FIG. 18.

First database 1801 indicates a "normal mode" and includes the detail of the operation of each device. Specific examples are as follows.
Device:
 "Device" refers to device #1 with 1601_1, device #2 with 1601_2, device #3 with 1601_3, and device #4 with 1601_4 in FIGS. 16 and 17.
 The "device" transmits device-related data using the first frequency band.

Network Control Device:
 "Network control device" refers to network control device 1606 in FIGS. 16 and 17.
 The "network control device" controls a network so that a base station and a private server communicate with each other via the network. Note that the base station and the private server will be described below.
Base Station:
 The "base station" refers to base station #1 with 1602_1 and base station #2 with 1602_2 in FIGS. 16 and 17.
 The "base station" communicates with the "device". The "base station" also communicates with the "private server". Note that the "private server" will be described below.
Private Server:
 The "private server" refers to private server 1604 in FIGS. 16 and 17.
 The "private server" communicates with the "base station".

Second database 1802 indicates an "emergency mode" and includes the detail of the operation of each device. Specific examples are as follows.
Device:
 "Device" refers to device #1 with 1601_1, device #2 with 1601_2, device #3 with 1601_3 and device #4 with 1601_4 in FIGS. 16 and 17.
 The "device" stops transmitting the device-related data using the first frequency band. The "device" then transmits data to be transmitted to an "external server" using the first frequency band. Note that the "external server" will be described below.
Network Control Device:
 "Network control device" refers to network control device 1606 in FIGS. 16 and 17.
 The "network control device" controls a network so that a base station and the external server communicate with each other via the network. Note that the base station and the external server will be described below
Base Station:
 The "base station" refers to base station #1 with 1602_1 and base station #2 with 1602_2 in FIGS. 16 and 17.
 The "base station" communicates with the "device". The "base station" also communicates with the "external server". Note that the "external server" will be described below
External Server:
 The "external server" refers to external server 1605 in FIGS. 16 and 17.
 The "external server" communicates with the "base station".

The following is a supplementary description of the private server and the external server described above.

For example, a particular apparatus has access to the private server. In addition, a particular user has access to the private server by using an apparatus. The access to the private server, however, is not limited to the examples, and the private server may be a first server.

For example, access to the external server need not be restricted, or is allowed with a password. The access to the external server, however, is not limited to the example, and the external server may be a second server different from the first server.

The following is a supplementary description of the device-related data transmitted by the "device" described above.

In a case where the "device" includes a sensor for images, temperature, acceleration, etc., for example, data obtained by the sensor may be the device-related data. The device-related data may also be, for example, information indicating "a state of the device" such as a failure state of the device. Further, the device-related data may be information related to a user of the "device". The device-related data, however, is not limited to the above examples.

Note that the database in FIG. 18 is composed of the two types of databases (first database 1801 and second database 1802), but the same can be implemented with one or more types or two or more types of databases. Although the databases in FIG. 18 include no area information, the databases may include area information.

Next, exemplary operations of the system in FIGS. 16 and 17 will be described along the time line. In the following, descriptions will be given of a case where first apparatus 102 in FIGS. 16 and 17 transmits the databases at a time and a case where first apparatus 102 transmits the databases one for each time. Note that first apparatus 102 is not illustrated in FIGS. 16 and 17 as already mentioned.

Figure 19:
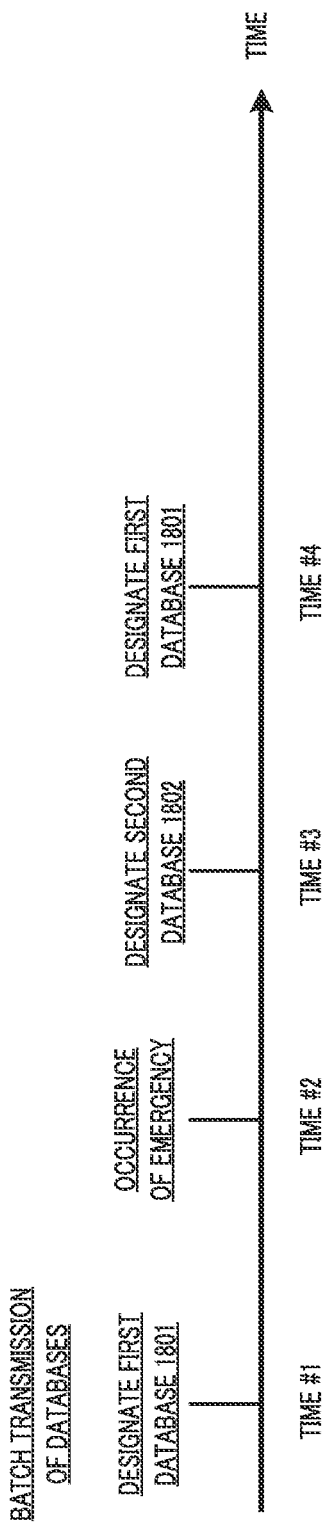
FIG. 19 illustrates a first example of an operation of transmitting the database by a first apparatus according to Embodiment 2.

FIG. 19 illustrates an exemplary operation along the time line in the case where first apparatus 102 in FIGS. 16 and 17 transmits the databases at a time. Note that the horizontal axis indicates time in FIG. 19.

At time #1, first apparatus 102 present in FIGS. 16 and 17 transmits modulated signals including information corresponding to, for example, the databases of "first database 1801 and second database 1802" in FIG. 18. Therefore, the databases are transmitted as a batch transmission.

First apparatus 102 present in FIGS. 16 and 17 transmits modulated signals including information that indicates "use of first database 1801" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 1801. That is, this forms the system as illustrated in FIG. 16.

Then, it is assumed that an emergency, such as a disaster, has occurred at time #2, for example.

Accordingly, at time #3, first apparatus 102 present in FIGS. 16 and 17 transmits modulated signals including information that indicates "use of second database 1802" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on second database 1802. That is, this forms the system as illustrated in FIG. 17.

Then, at time #4, which is some time after time #3, first apparatus 102 present in FIGS. 16 and 17 transmits modulated signals including information that indicates "use of first database 1801" to "device #1 with 1601_1, device #2 with 1601_2, device #3 with 1601_3, device #4 with 1601_4, base station #1 with 1602_1 base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 1801. That is, this forms the system as illustrated in FIG. 16.

In this way, switching the communication methods based on the state of emergency produces the effect of increasing the probability of transmitting more appropriate data to users.

Note that, although first apparatus 102 performs the batch transmission of the databases at time #1 in FIG. 19, the batch transmission of the databases may be performed at another time as well. Accordingly, even when an apparatus, such as a terminal, a communication apparatus, and a base station, is newly added to FIG. 16 and/or FIG. 17, the new apparatus, such as the terminal, the communication apparatus, and the base station, can obtain the databases, and this produces the effect of achieving the communication based on the databases.

In addition, "device #1 with 1601_1, device #2 with 1601_2, device #3 with 1601_3, and device #4 with 1601_4", which have received the information indicating the "use of second database 1802", may notify (indicate to) the users of the devices that the communication with external server 1605 is enabled. The above indication may be performed via network 1603, or may be performed via a network other than network 1603.

The information inputted from "device #1 with 1601_1, device #2 with 1601_2, device #3 with 1601_3, and device #4 with 1601_4" to external server 1605 may be deleted from external server 1605 after the information indicating the "use of first database 1801" is transmitted at time #4 in FIG. 19 or after a predetermined period has elapsed.

Figure 20:
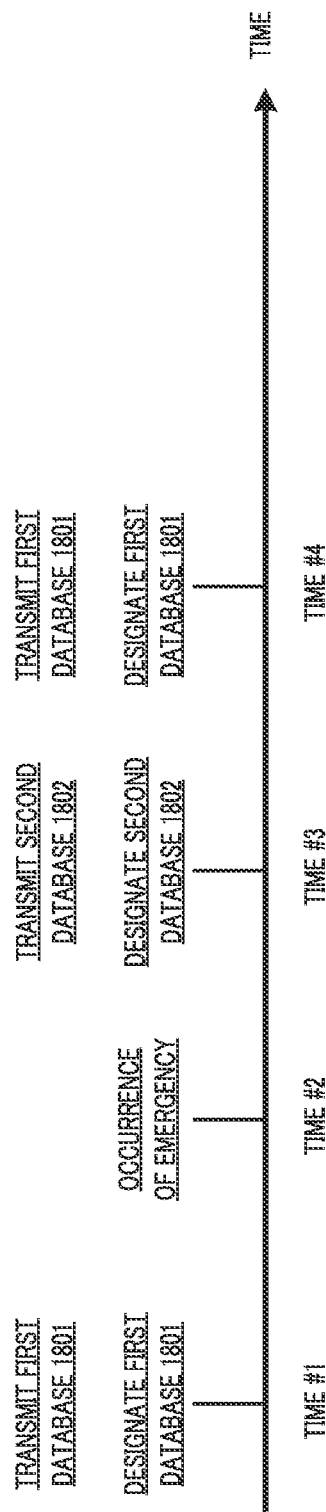
FIG. 20 illustrates a second example of the operation of transmitting the database by the first apparatus according to Embodiment 2.

FIG. 20 illustrates an exemplary operation along the time line in the case where first apparatus 102 in FIGS. 16 and 17 transmits the databases one for each time. Note that the horizontal axis indicates time in FIG. 20.

At time #1, first apparatus 102 present in FIGS. 16 and 17 transmits modulated signals including information corresponding to, for example, the database of "first database 1801" in FIG. 18.

First apparatus 102 present in FIGS. 16 and 17 also transmits modulated signals including information that indicates "use of first database 1801" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 1801. That is, this forms the system as illustrated in FIG. 16.

Then, t is assumed that an emergency, such as a disaster, has occurred at time #2, for example.

Accordingly, at time #3, first apparatus 102 present in FIGS. 16 and 17 transmits modulated signals including information corresponding to the database of "second database 1802" in FIG. 18.

First apparatus 102 present in FIGS. 16 and 17 also transmits modulated signals including information that indicates "use of second database 1802" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on second database 1802. That is, this forms the system as illustrated in FIG. 17.

Then, at time #4, which is some time after time #3 first apparatus 102 present in FIGS. 16 and 17 transmits modulated signals including information corresponding to, for example, the database of "first database 1801" in FIG. 18.

First apparatus 102 present in FIGS. 16 and 17 also transmits modulated signals including information that indicates "use of first database 1801" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 1801. That is, this forms the system as illustrated in FIG. 16.

In this way, switching the communication methods based on the state of emergency produces the effect of increasing the probability of transmitting more appropriate data to users.

Figure 21:
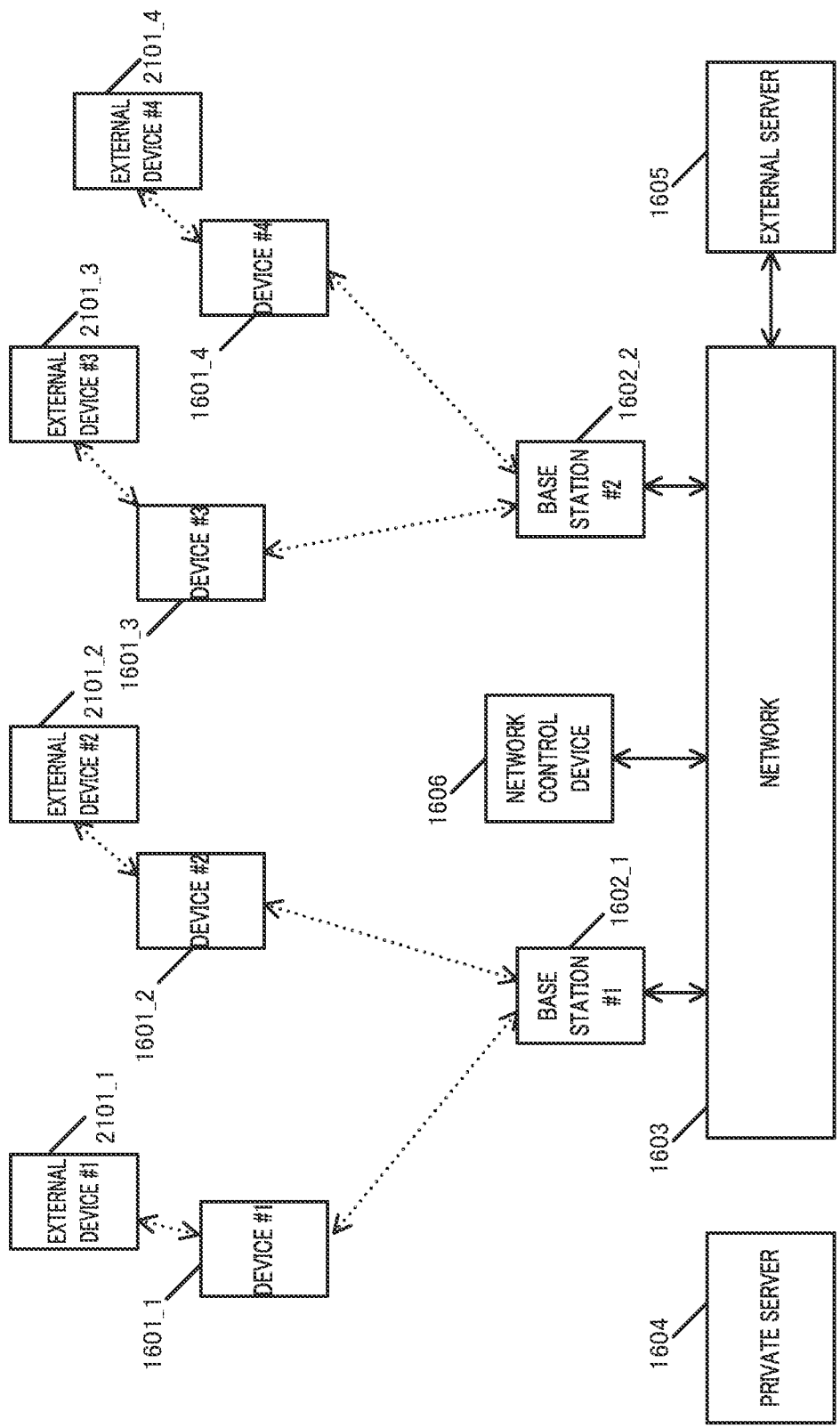
FIG. 21 illustrates a third example of the configuration of the system according to Embodiment 2.

Next, a system configuration in FIG. 21, which is different from that in FIG. 17, will be described. In FIG. 21, components that operate in the same way as in FIG. 17 are denoted by the same reference signs, and descriptions of the components that operate in the same way are omitted. Note that first apparatus 102 is present in FIG. 21, although not illustrated, and first apparatus 102 transmits modulated signals to the devices respectively. This point has already been described, and a description thereof is thus omitted.

In FIG. 21, external device #1 with 2101_1 communicates with device #1 with 1601_1. At this time, the first frequency band may be used, or another frequency band may be used. The communication may be radio communication or wired communication.

External device #2 with 2101_2 communicates with device #2 with 1601_2. At this time, the first frequency band may be used, or another frequency band may be used. The communication may be radio communication or wired communication.

External device #3 with 2101_3 communicates with device #3 with 1601_3. At this time, the first frequency band may be used, or another frequency band may be used. The communication may be radio communication or wired communication.

External device #4 with 2101_4 communicates with device #4 with 1601_4. At this time, the first frequency band may be used, or another frequency band may be used. The communication may be radio communication or wired communication.

Device #1 with 1601_1 generates a modulated signal including data obtained from external device #1 with 2101_1, and transmits the modulated signal to base station #1 with 1602_1. Note that the communication method may be radio communication or wired communication.

Then, base station #1 with 1602_1 transmits the data obtained from device #1 with 1601_1 to external server 1605 via a network.

Device #2 with 1601_2 generates a modulated signal including data obtained from external device #2 with 2101_2, and transmits the modulated signal to base station #1 with 1602_1. Note that the communication method may be radio communication or wired communication.

Then, base station #1 with 1602_1 transmits the data obtained from device #2 with 1601_2 to external server 1605 via the network.

Device #3 with 1601_3 generates a modulated signal including data obtained from external device #3 with 2101_3, and transmits the modulated signal to base station #2 with 1602_2. Note that the communication method may be radio communication or wired communication.

Then, base station #2 with 1602_2 transmits the data obtained from device #3 with 1601_3 to external server 1605 via the network.

Device #4 with 1601_4 generates a modulated signal including data obtained from external device #4 with 2101_4, and transmits the modulated signal to base station #2 with 1602_2. Note that the communication method may be radio communication or wired communication.

Then, base station #2 with 1602_2 transmits the data obtained from device #4 with 1601_4 to external server 1605 via the network.

Next, FIG. 22 will be described as an exemplary configuration of the database on communication, which is taken as input by first apparatus 102 present in FIGS. 16 and 21.

Figure 22:
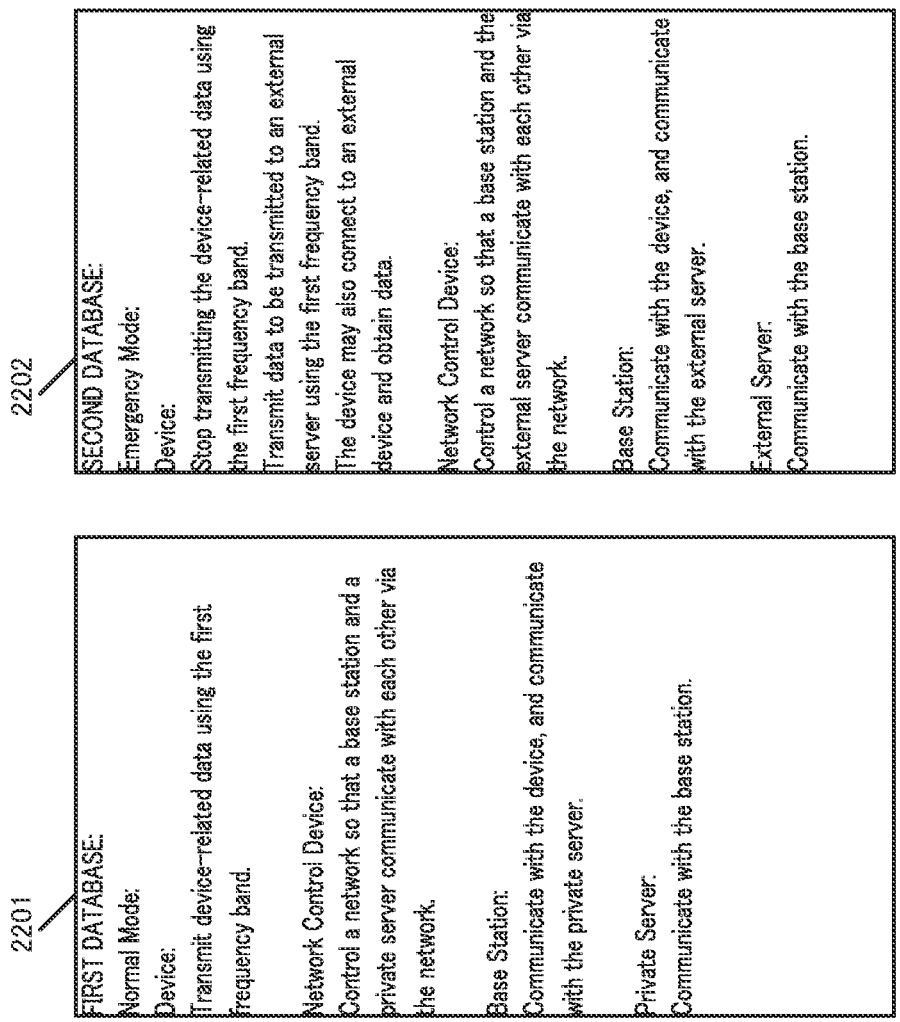
FIG. 22 illustrates a second example of the database according to Embodiment 2.

The database on communication is composed of two types of databases, which are first database 2201 and second database 2202, as illustrated in FIG. 22.

First database 2201 indicates a "normal mode" and includes the detail of the operation of each device. Specific examples are as follows.

Device:
    "Device" refers to device #1 with 1601_1, device #2 with 1601_2, device #3 with 1601_3, and device #4 with 1601_4 in FIGS. 16 and 21.
    The "device" transmits device-related data using the first frequency band.

Network Control Device:
    "Network control device" refers to network control device 1606 in FIGS. 16 and 21.
    The "network control device" controls a network so that a base station and a private server communicate with each other via the network. Note that the base station and the private server will be described below.

Base Station:
    The "base station" refers to base station #1 with 1602_1 and base station #2 with 1602_2 in FIGS. 16 and 21.
    The "base station" communicates with the "device". The "base station" also communicates with the "private server". Note that the "private server" will be described below.

Private Server:
    The "private serer" refers to private server 1604 in FIGS. 16 and 21. The "private server" communicates with the "base station".

Second database 2202 indicates an "emergency mode", and includes the detail of the operation of each device. Specific examples are as follows.

Device:
    "Device" refers to device #1 with 1601_1, device #2 with 1601_2, device #3 with 1601_3, and device #4 with 1601_4 in FIGS. 16 and 21.
    The "device" stops transmitting the device-related data using the first frequency band. The "device" then transmits data to be transmitted to an "external server" using the first frequency band. Note that the "external server" swill be described below.
    The "device" may also connect to an "external device." and obtain data.
    Note that the "external device" refers to external device #1 with 2101_1, external device #2 with 2101_2 external device #3 with 2101_3, and external device #4 with 2101_4 in FIG. 21.

Network Control Device:
"Network control device" refers to network control device 1606 in FIGS. 16 and 21.

The "network control device" controls a network so that a base station and an external server communicate with each other via the network. Note that the base station and the external server will be described below.

Base Station:
The "base station" refers to base station #1 with 1602_1 and base station #2 with 1602_2 in FIGS. 16 and 21.

The "base station" communicates with the "device". The "base station" also communicates with the "external server". Note that the "external server" will be described below External Server:
The "external server" refers to external server 1605 in FIGS. 16 and 21.

The "external server" communicates with the "base station".

The following is a supplementary description of the private server and the external server described above.

For example, a particular apparatus has access to the private server. In addition, a particular user has access to the private server by using an apparatus. The access to the private server, however, is not limited to the examples, and the private server may be a first server.

For example, access to the external server need not be restricted, or may be allowed with a password. The access to the external server, however, is not limited to the example, and the external server may be a second server different from the first server.

The following is a supplementary description of the device-related data transmitted by the "device" described above.

In a case where the "device" includes a sensor for images, temperature, acceleration, etc., for example, data obtained by the sensor may be the device-related data. The device-related data may also be, for example, information indicating "a state of the device" such as a failure state of the device. Further, the device-related data may be information related to a user of the "device". The device-related data, however, is not limited to the above examples.

Note that the database in FIG. 22 is composed of the two types of databases (first database 2201 and second database 2202), but the same can be implemented with one or more types or two or more types of databases. Although the databases in FIG. 22 include no area information, the databases may include area information.

Next, exemplary operations of the system in FIGS. 16 and 21 will be described along the time line. In the following, descriptions will be given of a case where first apparatus 102 in FIGS. 16 and 21 transmits the databases at a time and a case where first apparatus 102 transmits the databases one for each time. Note that first apparatus 102 is not illustrated in FIGS. 16 and 21 as already mentioned.

Figure 23:
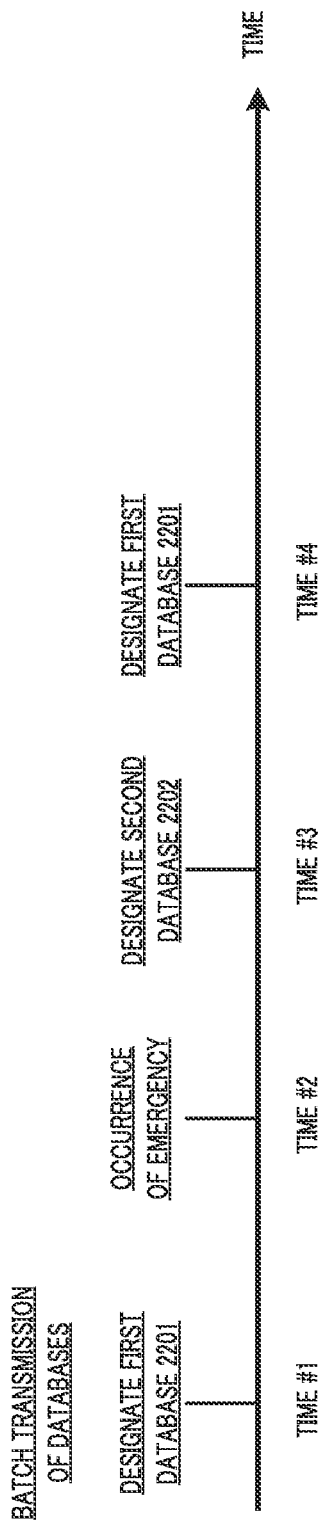
FIG. 23 illustrates a third example of the operation of transmitting the database by the first apparatus according to Embodiment 2.

FIG. 23 illustrates an exemplary operation along the time line in the case where first apparatus 102 in FIGS. 16 and 21 transmits the databases at a time. Note that the horizontal axis indicates time in FIG. 23.

At time #1, first apparatus 102 present in FIGS. 16 and 21 transmits modulated signals including information corresponding to, for example, the databases of "first database 2201 and second database 2202" in FIG. 22. Therefore, the databases are transmitted as a batch transmission.

First apparatus 102 present in FIGS. 16 and 21 transmits modulated signals including information that indicates "use of first database 2201" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 2201. That is, this forms the system as illustrated in FIG. 16. Note that first apparatus 102 present in FIGS. 16 and 21 may or may not transmit the modulated signals including the information that indicates the "use of first database 2201" to "external device #1 with 2101_1, external device #2 with 2101_2, external device #3 with 2101_3, and external device #4 with 2101_4" in FIG. 21.

Then, it is assumed that an emergency, such as a disaster, has occurred at time #2, for example.

Accordingly, at time #3, first apparatus 102 present in FIGS. 16 and 21 transmit modulated signals including information that indicates "use of second database 2202" to "device #1 with 1601_1, device #2 with 1601_2, device #3 with 1601_3, device #4 with 1601_4 base station #1 with 1602_1, base station #2 with 1602_2, private server 1604, and external server 1605". This causes "device #1 with 1601_1, device #2 with 1601_2, device with 1601_3, device #4 with 1601_4 base station #1 with 1602_1, base station #2 with 1602_2, private server 1604, and external server 1605" to perform communication based on second database 2202. That is, this forms the system as illustrated in FIG. 21. Note that first apparatus 102 present in FIGS. 16 and 21 may or may not transmit the modulated signals including the information that indicates the "use of second database 2202" to "external device #1 with 2101_1, external device #2 with 2101_2, external device #3 with 2101_3, and external device #4 with 2101_4" in FIG. 21.

Then, at time #4 which is some time after time #3, first apparatus 102 present in FIGS. 16 and 21 transmits modulated signals including information that indicates "use of first database 2201" to "device #1 with 1601_1, device #2 with 1601_2, device #3 with 1601_3 device #4 with 1601_4, base station #1 with 1602_1, base station #2 with 1602_2, private server 1604, and external server 1605". This causes "device #1 with 1601_1 device with 1601_2, device #3 with 1601_3, device #4 with 1601_4, base station #1 with 1602_1, base station #2 with 1602_2, private server 1604, and external server 1605" to perform communication based on first database 2201. That is, this forms the system as illustrated in FIG. 16. Note that first apparatus 102 present in FIGS. 16 and 21 may or may not transmit the modulated signals including the information that indicates the "use of first database 2201" to "external device #1 with 2101_1, external device #2 with 2101_2, external device #3 with 2101_3, and external device #4" in FIG. 21.

In this way, switching the communication methods based on the state of emergency produces the effect of increasing the probability of transmitting more appropriate data to users.

Note that, although first apparatus 102 performs the batch transmission of the databases at time #1 in FIG. 23, the batch transmission of the databases may be performed at another time as well. Accordingly, even when an apparatus, such as a terminal, a communication apparatus, and a base station, is newly added to FIG. 16 and/or FIG. 21, the new apparatus, such as the terminal, the communication apparatus, and the base station, can obtain the databases, and this produces the effect of achieving the communication based on the databases.

Figure 24:
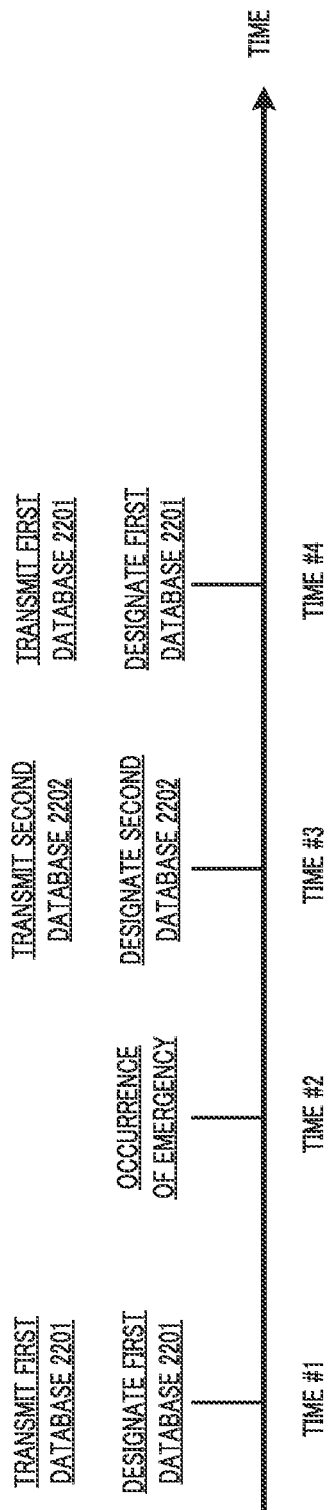
FIG. 24 illustrates a fourth example of the operation of transmitting the database by the first apparatus according to Embodiment 2.

FIG. 24 illustrates an exemplary operation along the time line in the case where first apparatus 102 in FIGS. 16 and 21 transmits the databases one for each time. Note that the horizontal axis indicates time in FIG. 24.

At time #1, first apparatus 102 present in FIGS. 16 and 21 transmits modulated signals including information corresponding to, for example, the database of "first database 2201" in FIG. 22.

First apparatus 102 present in FIGS. 16 and 21 transmits modulated signals including information that indicates "use of first database 2201" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 2201. That is, this forms the system as illustrated in FIG. 16. Note that first apparatus 102 present in FIGS. 16 and 21 may or may not transmit the modulated signals including the information that indicates the "use of first database 2201" to "external device #1 with 2101_1, external device #2 with 2101_2, external device #3 with 2101_3, and external device #4 with 2101_4" in FIG. 21.

Then, it is assumed that an emergency, such as a disaster, has occurred at time #2, for example.

Accordingly, at time #3, first apparatus 102 present in FIGS. 16 and 21 transmits modulated signals including information corresponding to the database of "second database 2202" in FIG. 22.

First apparatus 102 present in FIGS. 16 and 21 also transmits modulated signals including information indicating "use of second database 2202" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on second database 2202. That is, this forms the system as illustrated in FIG. 21. Note that first apparatus 102 present in FIGS. 16 and 21 may or may not transmit the modulated signals including the information that indicates the "use of second database 2202" to "external device #1 with 2101_1, external device #2 with 2101_2, external device #3 with 2101_3, and external device #4 with 2101_4" in FIG. 21.

Then, at time #4, which is some time after time #3, first apparatus 102 present in FIGS. 16 and 21 transmits modulated signals including information corresponding to, for example, the database of "first database 2201" in FIG. 22.

First apparatus 102 present in FIGS. 16 and 21 transmits modulated signals including information that indicates "use of first database 2201" to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 2201. That is, this forms the system as illustrated in FIG. 16. Note that first apparatus 102 present in FIGS. 16 and 21 may or may not transmit the modulated signals including the information that indicates the "use of first database 2201" to "external device #1 with 2101_1, external device #2 with 2101_2, external device #3 with 2101_3, and external device #4 with 2101_4" in FIG. 21.

In this way, switching the communication methods based on the state of emergency produces the effect of increasing the probability of transmitting more appropriate data to users.

Next, a configuration in FIG. 25, which is different from that in FIG. 18, will be described as an exemplary configuration of data 101, which is the database on communication methods and is taken as input by first apparatus 102 present in FIGS. 16 and 17.

Figure 25:
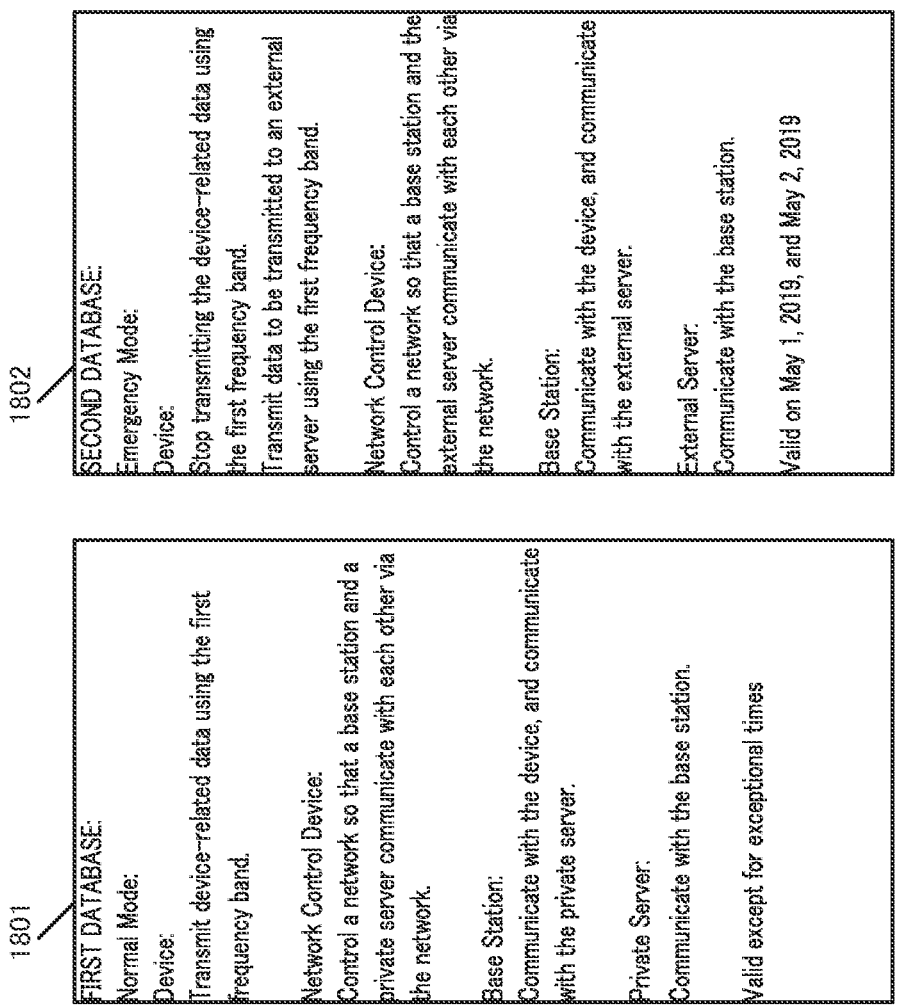
FIG. 25 illustrates a third example of the database according to Embodiment 2.

As in FIG. 18, the database is composed of first database 1801 and second database 1802 in FIG. 25. The following description is about a difference in FIG. 25 from FIG. 18.

First database 1801 and second database 1802 include time information.

As illustrated in FIG. 25, first database 1801 holds information that "first database 1801 is valid except for exceptional times" as the time information.

Also as illustrated in FIG. 25, second database 1802 holds information that "second database 1802 is valid on May 1, 2019 and May 2, 2019" as the time information.

Figure 26:
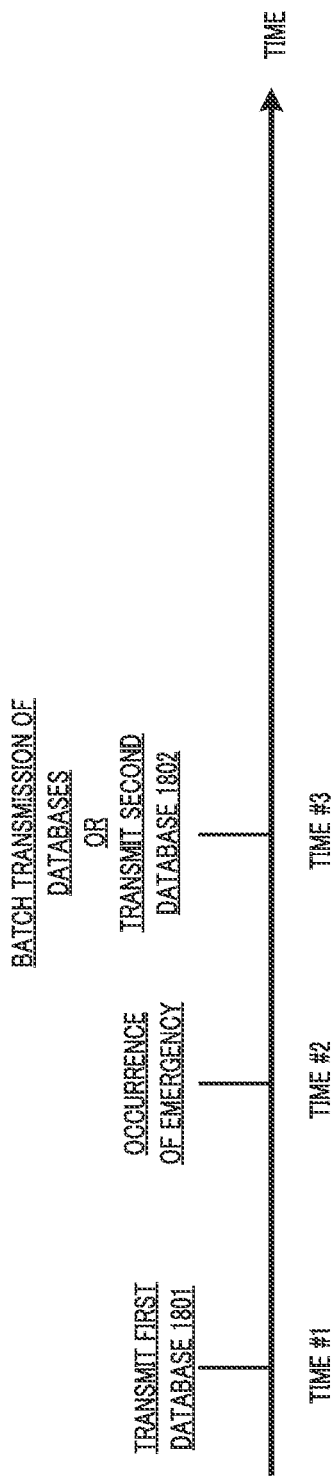
FIG. 26 illustrates a fifth example of the operation of transmitting the database by the first apparatus according to Embodiment 2.

FIG. 26 illustrates an exemplary operation of first apparatus 102 present in FIGS. 16 and 17 transmitting the databases along the time line. Note that the horizontal axis indicates time in FIG. 26.

At time #1, first apparatus 102 present in FIGS. 16 and 17 transmits modulated signals including information corresponding to the database of "first database 1801" in FIG. 25 to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601 device #4 with 1601_4, base station #1 with 1602_1, base station #2 with 1602_2, private server 1604, and external server 1605" to perform communication based on first database 1801. That is, this forms the system as illustrated in FIG. 16.

Then, it is assumed that an emergency, such as a disaster, has occurred at time #2 on Apr. 30, 2019, for example.

Accordingly, at time #3, first apparatus 102 present in FIGS. 16 and 17 transmits modulated signals including information corresponding to a database composed of "first database 1801 and second database 1802 in FIG. 25" or transmits modulated signals including information corresponding to a database composed of "second database 1802 in FIG. 25" to "device #1 with 1601_1, device #2 with 1601_2, device #3 with 1601_3, device #4 with 1601_4, base station #1 with 1602_1 base station #2 with 1602_2, private server 1604, and external server 1605".

This causes "device #1 with 1601_1, device #2 with 1601_2, device #3 with 1601 device #4 with 1601_4, base station #1 with 1602_1, base station #2 with 1602_2, private server 1604, and external server 1605" to perform communication based on second database 1802. That is, this forms the system as illustrated in FIG. 17.

For example, on May 1, 2019 and May 2, 2019, "device #1 with 1601_1, device #2 with 1601_2, device #3 with 1601_3, device #4 with 1601_4, base station #1 with 1602_1, base station #2 with 1602_2, private server 1604, and external server 1605" perform communication based on second database 1802. That is, this forms the system as illustrated in FIG. 17.

On May 3, 2019 onward, "device #1 with 1601_1, device #2 with 1601_2, device #3 with 1601_3, device #4 with 1601_4, base station #1 with 1602_1, base station #2 with 1602_2, private server 1604, and external server 1605" perform communication based on first database 1801. That is, this forms the system as illustrated in FIG. 16.

Note that the condition for returning from the communication based on second database 1802 in the emergency state to the communication based on first database 1801 in the normal state is not limited to the configuration of the validity period in second database 1802 as illustrated in FIG. 25. For example, after a predetermined period has elapsed from the occurrence of the emergency state, the communication based on second database 1802 in the emergency state may be returned to the communication based on first database 1801 in the normal state. In this case, the system illustrated in FIG. 17 may be switched to the system illustrated in FIG. 16 after the predetermined period has elapsed from the occurrence of the emergency state. At this time, first database 1801 in FIG. 25, for example, may include information of the predetermined period. For example, base station #1 with 1602_1 and base station #2 with 1602_2 may transmit the information of the predetermined period. In addition, the information of the predetermined period may be obtained by each device (base station, device, private server, external server, etc.) using another communication means. Note that information that network 1603 is connected to external server 1605 and information that network 1603 is disconnected from external server 1605 may be transmitted to each device (base station, device, private server, external server, etc.). The transmission of the above information may be performed via network 1603, or may be performed via a network other than network 1603.

In this way, switching the communication methods based on the state of emergency produces the effect of increasing the probability of transmitting more appropriate data to users.

Note that, in FIG. 26, first apparatus 102 performs the transmission of first database 1801 in FIG. 25 at time #1 but the transmission of first database 1801 may be performed at another time as well. Accordingly, even when an apparatus, such as a terminal, a communication apparatus, and a base station, is newly added to FIG. 16 and/or FIG. 17, the new apparatus, such as the terminal, the communication apparatus, and the base station, can obtain the databases, and this produces the effect of achieving the communication based on the databases.

In FIG. 25, the database is composed of the two types of databases (first database 1801 and second database 1802), but the same can be implemented with one or more types or two or more types of databases. In addition, the database need not include area information or may be configured to hold databases for one or more areas or two or more areas.

The method of configuring the time information is not limited to the example in FIG. 25, and the same can be obviously implemented by another method of configuring the time information.

Next, a configuration in FIG. 27, which is different from that in FIG. 22, will be described as an exemplary configuration of data 101, which is the database on communication methods and is taken as input by first apparatus 102 present in FIGS. 16 and 21.

Figure 27:
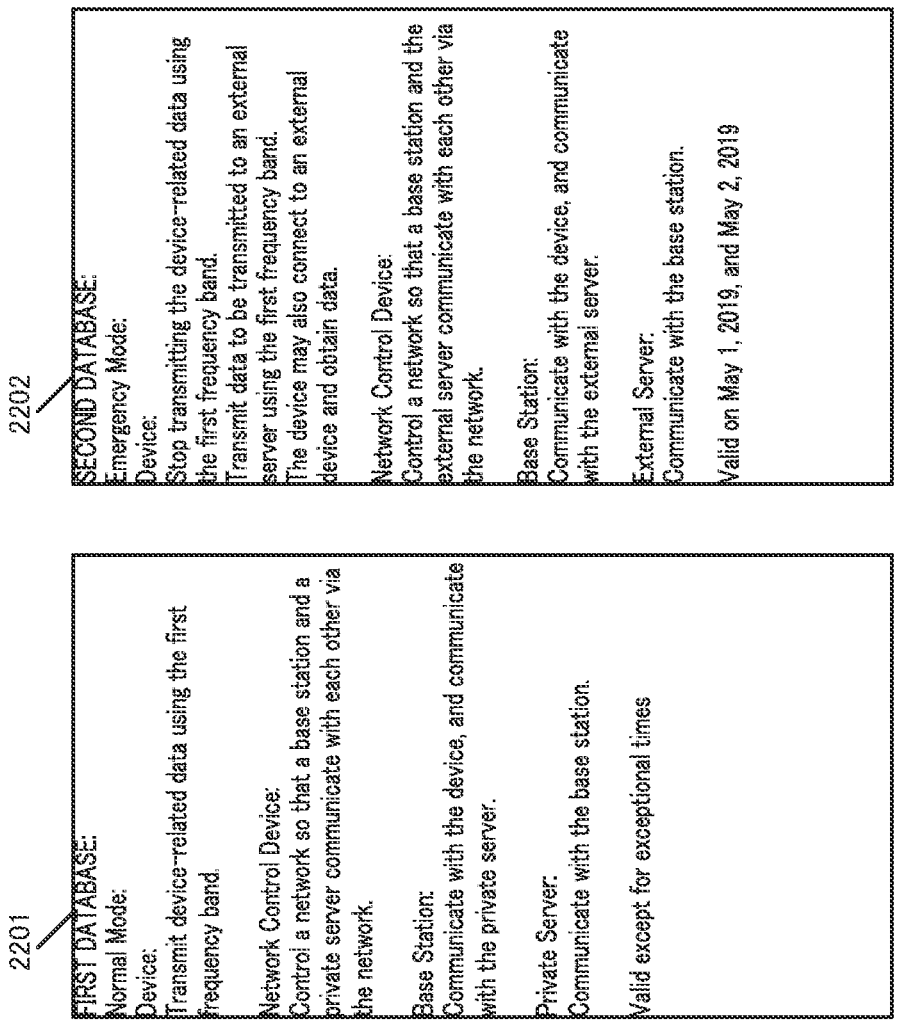
FIG. 27 illustrates a fourth example of the database according to Embodiment 2.

As in FIG. 22, the database is composed of first database 2201 and second database 2202 in FIG. 27. The following description is about a difference in FIG. 27 from FIG. 22.

First database 2201 and second database 2202 include time information.

As illustrated in FIG. 27, first database 2201 holds information that "first database 2201 is valid except for exceptional times" as the time information.

Also as illustrated in FIG. 27, second database 2202 holds information that "second database 2202 is valid on May 1, 2019 and May 2, 2019" as the time information.

Figure 28:
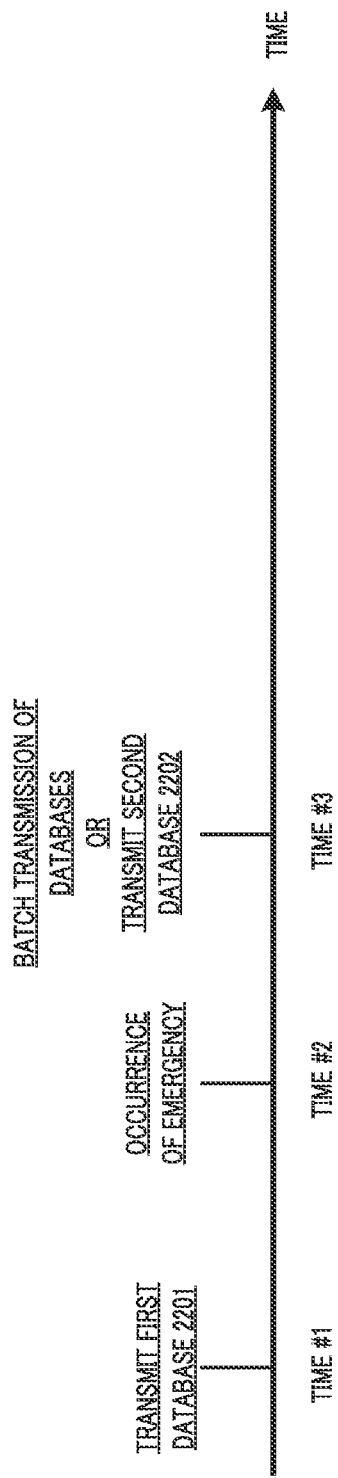
FIG. 28 illustrates a sixth example of the operation of transmitting the database by the first apparatus according to Embodiment 2.

FIG. 28 illustrates an exemplary operation of first apparatus 102 present in FIGS. 16 and 21 transmitting the databases along the time line. Note that the horizontal axis indicates time in FIG. 28.

At time #1, first apparatus 102 present in FIGS. 16 and 17 transmits modulated signals including information corresponding to the database of "first database 2201" in FIG. 27 to "device #1 with 1601_1, device #2 with 1601_2, device #3 with 1601_3, device #4 with 1601_4, base station #1 with 1602_1, base station #2 with 1602_2, private server 1604, and external server 1605". This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on first database 2201. That is, this forms the system as illustrated in FIG. 16. Note that first apparatus 102 present in FIGS. 16 and 21 may or may not transmit modulated signals including information that indicates "use of first database 2201" to "external device #1 with 2101_1 external device #2 with 2101_2, external device #3 with 2101_3, and external device #4 with 2101_4" in FIG. 21.

Then, it is assumed that an emergency, such as a disaster, has occurred at time #2 on Apr. 30, 2019, for example.

According, at time #3, first apparatus 102 present in FIGS. 16 and 21 transmits modulated signals including information corresponding to a database composed of "first database 2201 and second database 2202 in FIG. 27" or transmits modulated signals including information corresponding to a database composed of "second database 2202 in FIG. 27" to "device #1 with 1601_1, device #2 with 1601_2, device #3 with 1601_3, device #4 with 1601_4, base station #1 with 1602_1, base station #2 with 1602_2, private server 1604, and external server 1605".

This causes "device #1 with 1601_1, device #2 with 1601_2, device #3 with 1601_3, device #4 with 1601_4, base station #1 with 1602_1, base station #2 with 1602_2, private server 1604, and external server 1605" to perform communication based on second database 2202. That is, this forms the system as illustrated in FIG. 21.

For example, on May 1, 2019 and May 2, 2019, "device #1 with 1601_1, device #2 with 1601_2, device #3 with 1601_3, device #4 with 1601_4, base station #1 with 1602_1, base station #2 with 1602_2, private server 1604, and external server 1605" perform communication based on second database 2202. That is, this forms the system as illustrated in FIG. 21.

On May 3, 2019 onward, "device #1 with 160_1, device #2 with 1601_2, device #3 with 1601_3, device #4 with 1601_4, base station #1 with 1602_1, base station #2 with 1602_2, private server 1604, and external server 1605" perform communication based on first database 2201. That is, this forms the system as illustrated in FIG. 16.

Note that first apparatus 102 present in FIGS. 16 and 21 may or may not transmit modulated signals including information that indicates "use of first database 2201 and/or second database 2202" to "external device #1 with 2101_1, external device #2 with 2101_2, external device #3 with 2101_3, and external device #4 with 2101_4" in FIG. 21.

In this way, switching the communication methods based on the state of emergency produces the effect of increasing the probability of transmitting more appropriate data to users.

Note that, in FIG. 28, first apparatus 102 performs the transmission of first database 2201 in FIG. 27 at time #1, but the transmission of first database 2201 may be performed at another time as well. Accordingly, even when an apparatus, such as a terminal, a communication apparatus, and a base station, is newly added to FIG. 16 and/or FIG. 21, the new apparatus, such as the terminal, the communication apparatus, and the base station, can obtain the databases, and this produces the effect of achieving the communication based on the databases.

In FIG. 27, the database is composed of the two types of databases (first database 2201 and second database 2202), but the same can be implemented with one or more types or two or more types of databases. In addition, the database need not include area information or may be configured to hold databases for one or more areas or two or more areas.

The method of configuring the time information is not limited to the example in FIG. 27, and the same can be obviously implemented by another method of configuring the time information.

Next, a configuration in FIG. 29, which is different from that in FIG. 18, will be described as an exemplary configuration of data 101, which is the database on communication methods and is taken as input by first apparatus 102 present in FIGS. 16 and 17.

Figure 29:
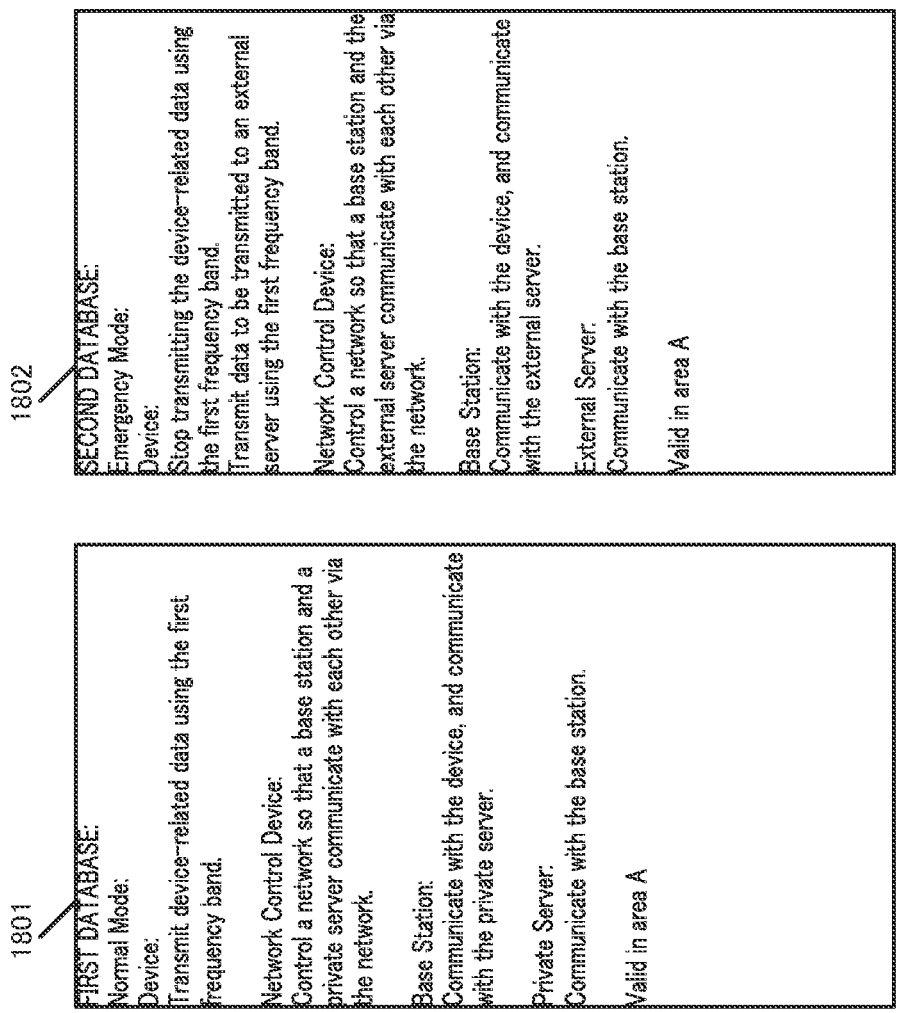
FIG. 29 illustrates a fifth example of the database according to Embodiment 2.

As in FIG. 18, the database is composed of first database 1801 and second database 1802 in FIG. 29. The following description is about a difference in FIG. 29 from FIG. 18.

First database 1801 and second database 1802 include area information.

As illustrated in FIG. 29, first database 1801 holds information that "first database 1801 is valid in area A" as the area information.

Also as illustrated in FIG. 29, second database 1802 holds information that "second database 1802 is valid in area A" as the area information.

Exemplary operations along the time line in a case where first apparatus 102 present in FIGS. 16 and 17 performs batch transmission of the databases in FIG. 29 and in a case where first apparatus 102 transmits the databases in FIG. 29 one for each time are the same as the exemplary operations described with reference to FIGS. 19, 20, 26, etc. and the descriptions thereof are thus omitted.

Note that "device #1 with 1601_1, device #2 with 1601_2, device #3 with 1601_3, device #4 with 1601_4, base station #1 with 1602_1, base station #2 with 1602_2, private server 1604, and external server 1605" in FIGS. 16 and 17 perform control whether to reflect the database based on whether they are related to area A. "Device #1 with 1601_1, device #2 with 1601_2, device #3 with 1601_3, device #4 with 1601_4, base station #1 with 1602_1, base station #2 with 1602_2, private server 1604, and external server 1605" reflect the database in a case where they are related to area A even when they are not present in area A.

In this way, switching the communication methods based on the state of emergency produces the effect of increasing the probability of transmitting more appropriate data to users.

Next, a configuration in FIG. 30, which is different from that in FIG. 22, will be described as an exemplary configuration of data 101, which is the database on communication methods and is taken as input by first apparatus 102 present its FIGS. 16 and 21.

Figure 30:
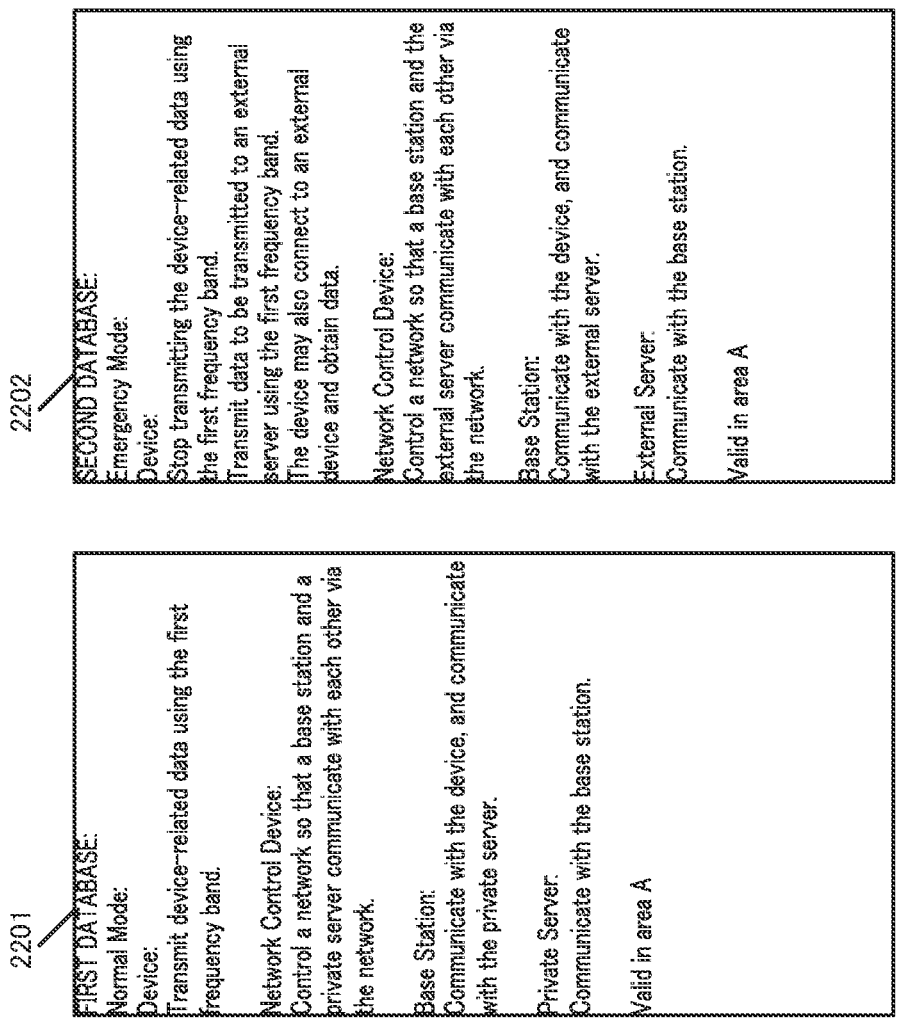
FIG. 30 illustrates a sixth example of the database according to Embodiment 2.

As in FIG. 22, the database is composed of first database 2201 and second database 2202 in FIG. 30. The following description is about a difference in FIG. 30 from FIG. 22.

First database 2201 and second database 2202 include area information.

As illustrated in FIG. 30, first database 2201 holds information that "first database 2201 is valid in area A" as the area information.

Also as illustrated in FIG. 30, second database 2202 holds information that "second database 2202 is valid in area A" as the area information.

Exemplary operations along the time line in a case where first apparatus 102 present in FIGS. 16 and 21 performs batch transmission of the databases in FIG. 30 and first apparatus 102 transmits the databases in FIG. 30 one for each time are the same as the exemplary operations described with reference to FIGS. 23, 24, 28, etc. and the descriptions thereof are thus omitted.

Note that "device #1 with 1601_1, device #2 with 1601_2, device #3 with 1601_3, device #4 with 1601_4, base station #1 with 1602_1 base station #2 with 1602_2, private server 1604, and external server 1605" in FIGS. 16 and 21 perform control whether to reflect the database based on whether they are related to area A. "Device #1 with 1601_1, device #2 with 1601_2, device #3 with 1601_3, device #4 with 1601_4, base station #1 with 1602_1, base station #2 with 1602_2, private server 1604 and external server 1605" reflect the database in a case where they are related to area A even when they are not present in area A.

In this way, switching the communication methods based on the state of emergency produces the effect of increasing the probability of transmitting more appropriate data to users.

Note that the database may hold databases for respective areas as illustrated in FIGS. 10, 11, and 12, in the present embodiment. Thus, the first databases and the second databases in FIGS. 18, 22, 25, 27, 29, and 30 may hold databases for a plurality of areas.

Further, the database may hold databases on transmission power for communication methods as illustrated in FIGS. 10, 11, and 12, in the present embodiment. Thus, the first databases and the second databases in FIGS. 18, 22, 25, 27, 29, and 30 may hold databases on transmission power for respective communication methods.

(Supplement 1)

Some of the embodiments and other contents, such as the supplementary descriptions, described in the specification can be obviously combined to be implemented.

Additionally, the embodiments and other contents are merely examples. For example, although "a modulation scheme, an error correction encoding scheme (an error correction code, a code length, and a code rate to be used), control information, and the like" are exemplified, the same configuration can be used for the implementation even with different "modulation scheme, error correction encoding scheme (error correction code, code length, and code rate to be used), control information, and the like".

In terms of the modulation scheme, the embodiments and other contents described in the specification can be implemented by using a modulation scheme other than the modulation scheme described in the specification. For example, Amplitude Phase Shift Keying (APSK), Pulse Amplitude Modulation (PAM), Phase Shift Keying (PSK), or Quadrature Amplitude Modulation (QAM) may be applied, and uniform mapping or non-uniform mapping may be used in each of the modulation schemes. The APSK includes, for example, 16 APSK, 64 APSK, 128 APSK, 256 APSK, 1024 APSK, and 4096 APSK, the PAM includes, for example, 4 PAM, 8 PAM, 16 PAM, 64 PAM, 128 PAM, 256 PAM, 1024 PAM, and 4096 PAM, the PSK includes, for example, BPSK, QPSK, 8 PSK, 16 PSK, 64 PSK, 128 PSK, 256 PSK, 1024 PSK, and 4096 PSK, and the QAM includes, for example, 4 QAM, 8 QAM, 16 QAM, 64 QAM, 128 QAM, 256 QAM, 1024 QAM, and 4096 QAM.

Further, the mapping method of 2, 4, 8, 16, 64, 128, 256, or 1024 of signal points on the I-Q plane (modulation scheme involving 2, 4, 8, 16, 64, 128, 256, or 1024 signal points) is not limited to the signal point mapping method of the modulation scheme described in the specification.

The "base station", "apparatus", and "communication apparatus" described in the specification may be, for example, a broadcasting station, a base station, an access point, a terminal, a mobile phone, a satellite-mounted communication apparatus, a repeater, a server, a cloud server, a computer, a smartphone, a personal computer, a tablet, or the like. The "terminal" described in the specification may be a television, a radio, a terminal, a mobile phone, an access point, a base station, a server, a cloud server, a satellite-mounted communication apparatus, a repeater, a computer, a smartphone, a personal computer, a tablet, or the like. In addition, the "base station", "apparatus", "communication apparatus", and "terminal" in the present disclosure may be a device having a communication function, and the device may be configured to be connected to an apparatus executing an application, such as a television, a radio, a personal computer, or a mobile phone, via some interface. Further, in the present embodiments, symbols other than data symbols (e.g., pilot symbols, symbols for control information, etc.) may be mapped in a frame in any way.

The pilot symbol and the symbol for control information may be referred to in any way, and for example, only need to be a known symbol, by a transmitter and a receiver, modulated using PSK modulation. Alternatively, the receiver may know the symbol transmitted by the transmitter by synchronization. The receiver uses the symbol to perform frequency synchronization, time synchronization, channel estimation (estimation of Channel State Information (CSI)) for each modulated signal, signal detection, etc. Note that the pilot symbol is sometimes referred to as a preamble, a unique word, a postamble, a reference symbol, or the like.

The symbol for control information is a symbol for transmitting information that needs to be transmitted to a communication counterpart (e.g., a modulation scheme, an error correction encoding scheme, a code rate of the error correction encoding scheme, and configuration information in a higher layer that are used for the communication) to realize communication other than data (application data, etc.) communication.

Note that the present disclosure is not limited to the above embodiments, and can be implemented with various modifications. For example, each of the embodiments is described based on performance by communication apparatuses, but the present disclosure is not limited thereto, and software can also perform the communication method.

Note that a program for performing the communication method may be stored in a Read Only Memory (ROM) in advance, for example, and the program may be operated by a Central Processor Unit (CPU).

Further, the program for performing the communication method may be stored in a computer-readable storage medium, and the program stored in the storage medium may be recorded in a Random Access Memory (RAM) of the computer so that the computer operates according to the program.

Each configuration in the embodiments described above can be typically realized by an LSI (Large Scale Integration), which is an integrated circuit including an input terminal and an output terminal. The LSI may be individually formed as chips, or one chip may be formed so as to include a part or all of the configurations in the embodiments described above. Although it is called the LSI here, it may be referred to as an IC (Integrated Circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. If future integrated circuit technology replaces LSIs as a result of the advancement of semiconductor technology or other derivative technology, the functional blocks could be integrated using the future integrated circuit technology. Biotechnology can also be applied.

Note that the transmission method supported by the "base station", "apparatus", "communication apparatus", and "terminal" may be a multi-carrier method such as OFDM, or may be a single-carrier method. In addition, the "base station", "apparatus", "communication apparatus", and "terminal" may support both the multi-carrier method and the single-carrier method. There are a plurality of methods of generating a modulated signal by the single-carrier method, and any of the methods can be implemented. For example, examples of the single-carrier method include "Discrete Fourier Transform (DFT)-Spread Orthogonal Frequency Division Multiplexing (OFDM)", "Trajectory Constrained DFT-Spread OFDM", "OFDM based Single Carrier (SC)", "Single Carrier (SC)-Frequency Division Multiple Access (FDMA)" "Guard interval INT-Spread OFDM", and the like.

Further, the "base station", "apparatus", "communication apparatus", and "terminal" may transmit one or more streams or one or more modulated signals using one or more antennas, and the "base station", "apparatus", "communication apparatus", and "terminal" may transmit two or more streams or two or more modulated signals using two or more antennas.

Note that at least one of a Field Programmable Gate Array (FPGA) and a Central Processing Unit (CPU) may be configured to download all or some of software required for implementing the communication methods described in the present disclosure by radio communication or wired communication. Further, at least one of the FPGA and the CPU may be configured to download all or some of software for updating by radio communication or wired communication. Then, the downloaded software may be stored in storage, and at least one of the FPGA and the CPU may be operated based on the stored software to perform the digital signal processing described in the present disclosure.

The device including at least one of the FPGA and the CPU may be connected to a communication modem by radio or wire, and the communication methods described in the present disclosure may be implemented by the device and the communication modem.

For example, a communication apparatus such as the "base station", "apparatus", "communication apparatus", and "terminal" described in the specification may include at least one of the FPGA and the CPU, and the communication apparatus may include an interface for externally obtaining software for operating at least one of the FPGA and the CPU. Further, the communication apparatus may include storage for storing the externally-obtained software, and the FPGA and/or the CPU may be operated based on the stored software to implement the signal processing described in the present disclosure.

Particularly when radio communication is performed by radio waves in the specification, there may be one antenna or two or more antennas for transmitting modulated signals. Likewise, there may be one antenna or two or more antennas for receiving modulated signals. In a case where there are two or more antennas for transmitting the modulated signals, the Multiple-Input Multiple-Output (MIMO) method, in which a plurality of modulated signals are transmitted using a plurality of antennas, may be applied. Thus, each of the embodiments of the present specification can also be implemented in the same manner h applying the MIMO method, and it produces the same effects.

Note that, in each of the above embodiments, each component may be configured by dedicated hardware, or may be realized by executing a software program suitable for each component. Each component may be realized by a program executer, such as a CPU or a processor, reading and executing a software program stored in a storage medium, such as a hard disk or a semiconductor memory. The software realizing the system, the apparatus, or the like of each of the above embodiments includes the following programs.

That is, a management apparatus includes a program for causing performing transmission, to a communication device, of first data including a configuration on communication in a normal state and second data including a configuration on communication in an emergency state, which are stored in a storage medium. Additionally, the communication device includes a program for causing performing control of a communication operation for another communication device in the normal state based on the first data received from the management apparatus, and control of the communication operation for the other communication device in the emergency state based on the second data received from the management apparatus.

Although the communication system and the like according to one or more aspects have been described above based on the embodiments, the present disclosure is not limited to the embodiments. The embodiments with various modifications conceivable by those skilled in the art and any forms configured by combining the components in the different embodiments may be included in the scope of the one or more aspects without departing from the spirit of the present disclosure.

The disclosure of Japanese Patent Application No. 2019-120107, filed on Jun. 27, 2019, including the specification, drawings and abstract, is incorporated herein by reference in its entirety.

INDUSTRIAL APPLICABILITY

The present disclosure is useful for building a network.

REFERENCE SIGNS LIST

102 First apparatus
103_1, 103_2, 103_3, 103_4, 1310, 1311 Terminal
104_1, 104_2, 104_3, 1350 Communication apparatus
302 First-communication-method communication apparatus
312 Second-communication-method communication apparatus
322 Third-communication-method communication apparatus
399 Another communication apparatus
501, 1801, 2201 First database
502, 1802, 2202 Second database
503 Third database
1601_1, 1601_2, 1601_3, 1601_4 Device
1602_1, 1602_2 Base station
1603 Network
1604 Private server
1605 External server
1606 Network control device
2101_1, 2101_2, 2101_3, 2101_4 External device

The invention claimed is:

1. A communication system, comprising:
a management apparatus including a first processor, which in operation, manages first data including a configuration on communication including information on an available communication method in a normal state and second data including a configuration on communication including information on an available communication method in an emergency state, wherein:
a channel spacing in the communication method available in the normal state is different from a channel spacing in the communication method available in the emergency state;
an error correction code available for the communication method available in the normal state is different from an error correction code available for the communication method available in the emergency state;
a maximum frequency band available for the communication method available in the normal state is different from a maximum frequency band available for the communication method available in the emergency state;
a subcarrier spacing available for the communication method available in the normal state is different from a subcarrier spacing available for the communication method available in the emergency state;
a code rate of an error correction code supported in the communication method available in the normal state is different from a code rate of an error correction code supported in the communication method available in the emergency state; or
combinations thereof; and
a communication device including a second processor, which in operation, controls a communication operation for another communication device in the normal state based on the first data received from the management apparatus, and controls the communication operation for the other communication device in the emergency state based on the second data received from the management apparatus.

2. The communication system according to claim 1, wherein,
the management apparatus transmits an indication of use of the second data in a case where the emergency state occurs, and
the communication device controls, when receiving the indication of the use of the second data, the communication operation for the other communication device in the emergency state based on the second data.

3. The communication system according to claim 1, wherein,
the second data includes a configuration on indoor communication, and
the communication device that is present indoors controls the communication operation for the other communication device in the emergency state based on the configuration on the indoor communication included in the second data.

4. The communication system according to claim 1, wherein, the second data includes a configuration on indoor communication that is applicable in a case where communication is possible with less than or equal to a predetermined transmission power, and the communication device that is present indoors and capable of communicating with less than or equal to the transmission power controls the communication operation for the other communication device in the emergency state based on the configuration on the indoor communication included in the second data.

5. The communication system according to claim 1, wherein, the second data includes a configuration on communication for each area, and the communication device controls the communication operation for the other communication device in the emergency state based on the configuration on communication associated, in the second data, with an area where the communication device is present.

6. A management apparatus, comprising:

a transmitter, which in operation, transmits, to a communication device, first data including a configuration on communication including information on an available communication method in a normal state and second data including a configuration on communication including information on an available communication method in an emergency state, wherein:

a channel spacing in the communication method available in the normal state is different from a channel spacing in the communication method available in the emergency state;

an error correction code available for the communication method available in the normal state is different from an error correction code available for the communication method available in the emergency state;

a maximum frequency band available for the communication method available in the normal state is different from a maximum frequency band available for the communication method available in the emergency state;

a subcarrier spacing available for the communication method available in the normal state is different from a subcarrier spacing available for the communication method available in the emergency state;

a code rate of an error correction code supported in the communication method available in the normal state is different from a code rate of an error correction code supported in the communication method available in the emergency state; or combinations thereof; and a controller including a processor, which in operation, indicates, to the communication device, control of a communication operation that is based on the second data, in accordance with occurrence of the emergency state.

7. A communication device, comprising:

a receiver, which in operation, receives, from a management apparatus, first data including a configuration on communication including information on an available communication method in a normal state and second data including a configuration on communication including information on an available communication method in an emergency state, wherein:

a channel spacing in the communication method available in the normal state is different from a channel spacing in the communication method available in the emergency state;

an error correction code available for the communication method available in the normal state is different from an error correction code available for the communication method available in the emergency state;

a maximum frequency band available for the communication method available in the normal state is different from a maximum frequency band available for the communication method available in the emergency state;

a subcarrier spacing available for the communication method available in the normal state is different from a subcarrier spacing available for the communication method available in the emergency state;

a code rate of an error correction code supported in the communication method available in the normal state is different from a code rate of an error correction code supported in the communication method available in the emergency state; or combinations thereof; and a controller including a processor, which in operation, controls a communication operation for another communication device in the normal state based on the first data received from the management apparatus, and controls the communication operation for the other communication device in the emergency state based on the second data received from the management apparatus.

8. A communication control method, comprising:

transmitting, to a communication device by a management apparatus, first data including a configuration on communication including information on an available communication method in a normal state and second data including a configuration on communication including information on an available communication method in an emergency state, wherein:

a channel spacing in the communication method available in the normal state is different from a channel spacing in the communication method available in the emergency state;

an error correction code available for the communication method available in the normal state is different from an error correction code available for the communication method available in the emergency state;

a maximum frequency band available for the communication method available in the normal state is different from a maximum frequency band available for the communication method available in the emergency state;

a subcarrier spacing available for the communication method available in the normal state is different from a subcarrier spacing available for the communication method available in the emergency state;

a code rate of an error correction code supported in the communication method available in the normal state is different from a code rate of an error correction code supported in the communication method available in the emergency state; or combinations thereof; and controlling, by the communication device, a communication operation for another communication device in the normal state based on the first data received from the management apparatus, and controls the communication operation for the other communication device in the emergency state based on the second data received from the management apparatus.

* * * * *